US007920135B2

(12) United States Patent
Sampsell et al.

(10) Patent No.: US 7,920,135 B2
(45) Date of Patent: Apr. 5, 2011

(54) METHOD AND SYSTEM FOR DRIVING A BI-STABLE DISPLAY

(75) Inventors: Jeffrey B. Sampsell, San Jose, CA (US); Karen Tyger, Foster City, CA (US); Mithran Mathew, Mountain View, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 633 days.

(21) Appl. No.: 11/096,547

(22) Filed: Apr. 1, 2005

(65) Prior Publication Data

US 2006/0066595 A1 Mar. 30, 2006

Related U.S. Application Data

(60) Provisional application No. 60/613,407, filed on Sep. 27, 2004.

(51) Int. Cl.
*G06F 3/038* (2006.01)

(52) U.S. Cl. ........................................ 345/204; 345/214

(58) Field of Classification Search .......... 345/204–206, 345/82–90, 55, 76, 108, 97, 100, 104, 690, 345/214; 359/198, 224, 247–295, 318, 320, 359/359, 578–589

See application file for complete search history.

(56) References Cited

U.S. PATENT DOCUMENTS 2,534,846 A 12/1950 Ambrose et al.
3,184,600 A 5/1965 Potter
3,371,345 A 2/1968 Lewis
3,410,363 A 11/1968 Schwartz
3,439,973 A 4/1969 Paul et al.
3,443,854 A 5/1969 Weiss (Continued)

FOREIGN PATENT DOCUMENTS

EP 0261897 A2 3/1988

(Continued)

OTHER PUBLICATIONS

Akasaka, "Three-Dimensional IC Trends," Proceedings of IEEE, vol. 74, No. 12, pp. 1703-1714 (Dec. 1986).

(Continued)

*Primary Examiner* — Alexander Eisen
*Assistant Examiner* — Jason M Mandeville
(74) *Attorney, Agent, or Firm* — Knobbe Martens Olson & Bear, LLP

(57) ABSTRACT

Methods and systems are disclosed for providing video data and display signals. In one embodiment, a system is configured to display video data on an array of bi-stable display elements, where the system includes a processor, a display comprising an array of bi-stable display elements, a driver controller connected to the processor and configured to receive video data from the processor, and an array driver configured to receive video data from the driver controller and display signals from the processor, and to display the video data on the array of bi-stable display elements using the display signals. In another embodiment, a method of displaying data on a bi-stable display includes transmitting display signals from a processor to a driver of an array of bi-stable display elements, and updating an image displayed on the array of bi-stable display elements, wherein the updating is based on signals from the driver and performed on a periodic basis that is based at least in part upon the transmitted display signals.

15 Claims, 13 Drawing Sheets

U.S. PATENT DOCUMENTS

| | | | | |
|---|---|---|---|---|
| 3,653,741 A | | 4/1972 | Marks | |
| 3,656,836 A | | 4/1972 | de Cremoux et al. | |
| 3,746,785 A | | 7/1973 | Te Velde | |
| 3,813,265 A | | 5/1974 | Marks | |
| 3,955,880 A | | 5/1976 | Lierke | |
| 3,972,040 A | | 7/1976 | Hilsum et al. | |
| 4,099,854 A | | 7/1978 | Decker et al. | |
| 4,228,437 A | | 10/1980 | Shelton | |
| 4,347,983 A | | 9/1982 | Bodai | |
| 4,377,324 A | | 3/1983 | Durand et al. | |
| 4,389,096 A | | 6/1983 | Hori et al. | |
| 4,392,711 A | | 7/1983 | Moraw et al. | |
| 4,403,248 A | | 9/1983 | te Velde | |
| 4,441,791 A | | 4/1984 | Hornbeck | |
| 4,445,050 A | | 4/1984 | Marks | |
| 4,459,182 A | | 7/1984 | Te Velde | |
| 4,482,213 A | | 11/1984 | Piliavin et al. | |
| 4,500,171 A | | 2/1985 | Penz et al. | |
| 4,519,676 A | | 5/1985 | te Velde | |
| 4,531,126 A | | 7/1985 | Sadones | |
| 4,566,935 A | | 1/1986 | Hornbeck | |
| 4,571,603 A | | 2/1986 | Hornbeck et al. | |
| 4,596,992 A | | 6/1986 | Hornbeck | |
| 4,615,595 A | | 10/1986 | Hornbeck | |
| 4,662,746 A | | 5/1987 | Hornbeck | |
| 4,663,083 A | | 5/1987 | Marks | |
| 4,681,403 A | | 7/1987 | te Velde et al. | |
| 4,710,732 A | | 12/1987 | Hornbeck | |
| 4,748,366 A | | 5/1988 | Taylor | |
| 4,786,128 A | | 11/1988 | Birnbach | |
| 4,790,635 A | | 12/1988 | Apsley | |
| 4,798,437 A | | 1/1989 | Rediker et al. | |
| 4,856,863 A | | 8/1989 | Sampsell et al. | |
| 4,857,978 A | | 8/1989 | Goldburt et al. | |
| 4,859,060 A | | 8/1989 | Katagiri et al. | |
| 4,900,136 A | | 2/1990 | Goldburt et al. | |
| 4,900,395 A | | 2/1990 | Syverson et al. | |
| 4,922,241 A | | 5/1990 | Inoue et al. | |
| 4,954,789 A | | 9/1990 | Sampsell | |
| 4,956,619 A | | 9/1990 | Hornbeck | |
| 4,965,562 A | | 10/1990 | Verhulst | |
| 4,977,009 A | | 12/1990 | Anderson et al. | |
| 4,982,184 A | | 1/1991 | Kirkwood | |
| 5,018,256 A | | 5/1991 | Hornbeck | |
| 5,022,745 A | | 6/1991 | Zayhowski et al. | |
| 5,028,939 A | | 7/1991 | Hornbeck et al. | |
| 5,037,173 A | | 8/1991 | Sampsell et al. | |
| 5,044,736 A | | 9/1991 | Jaskie et al. | |
| 5,061,049 A | | 10/1991 | Hornbeck | |
| 5,075,796 A | | 12/1991 | Schildkraut et al. | |
| 5,078,479 A | | 1/1992 | Vuilleumier | |
| 5,079,544 A | | 1/1992 | DeMond et al. | |
| 5,083,857 A | | 1/1992 | Hornbeck | |
| 5,096,279 A | | 3/1992 | Hornbeck et al. | |
| 5,099,353 A | | 3/1992 | Hornbeck | |
| 5,124,834 A | | 6/1992 | Cusano et al. | |
| 5,126,836 A | | 6/1992 | Um | |
| 5,142,405 A | | 8/1992 | Hornbeck | |
| 5,142,414 A | | 8/1992 | Koehler | |
| 5,148,157 A | | 9/1992 | Florence | |
| 5,153,771 A | | 10/1992 | Link et al. | |
| 5,162,787 A | | 11/1992 | Thompson et al. | |
| 5,168,406 A | | 12/1992 | Nelson | |
| 5,170,156 A | | 12/1992 | DeMond et al. | |
| 5,172,262 A | | 12/1992 | Hornbeck | |
| 5,179,274 A | | 1/1993 | Sampsell | |
| 5,185,660 A | | 2/1993 | Um | |
| 5,192,395 A | | 3/1993 | Boysel et al. | |
| 5,192,946 A | | 3/1993 | Thompson et al. | |
| 5,206,629 A | | 4/1993 | DeMond et al. | |
| 5,214,419 A | | 5/1993 | DeMond et al. | |
| 5,214,420 A | | 5/1993 | Thompson et al. | |
| 5,216,537 A | | 6/1993 | Hornbeck | |
| 5,226,099 A | | 7/1993 | Mignardi et al. | |
| 5,228,013 A | | 7/1993 | Bik | |
| 5,231,532 A | | 7/1993 | Magel et al. | |
| 5,233,385 A | | 8/1993 | Sampsell | |
| 5,233,456 A | | 8/1993 | Nelson | |
| 5,233,459 A | | 8/1993 | Bozler et al. | |
| 5,244,707 A | | 9/1993 | Shores | |
| 5,254,980 A | | 10/1993 | Hendrix et al. | |
| 5,272,473 A | | 12/1993 | Thompson et al. | |
| 5,278,652 A | | 1/1994 | Urbanus et al. | |
| 5,280,277 A | | 1/1994 | Hornbeck | |
| 5,287,096 A | | 2/1994 | Thompson et al. | |
| 5,293,272 A | | 3/1994 | Jannson et al. | |
| 5,296,950 A | | 3/1994 | Lin et al. | |
| 5,304,419 A | | 4/1994 | Shores | |
| 5,305,640 A | | 4/1994 | Boysel et al. | |
| 5,311,360 A | | 5/1994 | Bloom et al. | |
| 5,312,513 A | | 5/1994 | Florence et al. | |
| 5,323,002 A | | 6/1994 | Sampsell et al. | |
| 5,324,683 A | | 6/1994 | Fitch et al. | |
| 5,325,116 A | | 6/1994 | Sampsell | |
| 5,326,430 A | | 7/1994 | Cronin et al. | |
| 5,327,286 A | | 7/1994 | Sampsell et al. | |
| 5,331,454 A | | 7/1994 | Hornbeck | |
| 5,339,116 A | | 8/1994 | Urbanus et al. | |
| 5,353,114 A | | 10/1994 | Hansen | |
| 5,358,601 A | | 10/1994 | Cathey | |
| 5,365,283 A | | 11/1994 | Doherty et al. | |
| 5,381,253 A | | 1/1995 | Sharp et al. | |
| 5,401,983 A | | 3/1995 | Jokerst et al. | |
| 5,411,769 A | | 5/1995 | Hornbeck | |
| 5,444,566 A | | 8/1995 | Gale et al. | |
| 5,446,479 A | | 8/1995 | Thompson et al. | |
| 5,448,314 A | | 9/1995 | Heimbuch et al. | |
| 5,450,205 A | | 9/1995 | Sawin et al. | |
| 5,452,024 A | | 9/1995 | Sampsell | |
| 5,454,906 A | | 10/1995 | Baker et al. | |
| 5,457,493 A | | 10/1995 | Leddy et al. | |
| 5,457,566 A | | 10/1995 | Sampsell et al. | |
| 5,459,602 A | | 10/1995 | Sampsell | |
| 5,459,610 A | | 10/1995 | Bloom et al. | |
| 5,461,411 A | | 10/1995 | Florence et al. | |
| 5,474,865 A | | 12/1995 | Vasudev | |
| 5,489,952 A | | 2/1996 | Gove et al. | |
| 5,497,172 A | | 3/1996 | Doherty et al. | |
| 5,497,197 A | | 3/1996 | Gove et al. | |
| 5,499,037 A | | 3/1996 | Nakagawa et al. | |
| 5,499,062 A | | 3/1996 | Urbanus | |
| 5,500,635 A | | 3/1996 | Mott | |
| 5,500,761 A | | 3/1996 | Goossen et al. | |
| 5,506,597 A | | 4/1996 | Thompson et al. | |
| 5,515,076 A | | 5/1996 | Thompson et al. | |
| 5,517,347 A | | 5/1996 | Sampsell | |
| 5,523,803 A | | 6/1996 | Urbanus et al. | |
| 5,526,051 A | | 6/1996 | Gove et al. | |
| 5,526,172 A | | 6/1996 | Kanack | |
| 5,526,327 A | | 6/1996 | Cordova, Jr. | |
| 5,526,688 A | | 6/1996 | Boysel et al. | |
| 5,530,240 A | | 6/1996 | Larson et al. | |
| 5,535,047 A | | 7/1996 | Hornbeck | |
| 5,546,104 A | * | 8/1996 | Kuga | 345/99 |
| 5,548,301 A | | 8/1996 | Kornher et al. | |
| 5,548,329 A | | 8/1996 | Klatt | |
| 5,550,373 A | | 8/1996 | Cole et al. | |
| 5,551,293 A | | 9/1996 | Boysel et al. | |
| 5,552,568 A | * | 9/1996 | Onodaka et al. | 178/18.03 |
| 5,552,924 A | | 9/1996 | Tregilgas | |
| 5,552,925 A | | 9/1996 | Worley | |
| 5,559,358 A | | 9/1996 | Burns et al. | |
| 5,563,398 A | | 10/1996 | Sampsell | |
| 5,567,334 A | | 10/1996 | Baker et al. | |
| 5,570,135 A | | 10/1996 | Gove et al. | |
| 5,576,731 A | | 11/1996 | Whitby et al. | |
| 5,579,149 A | | 11/1996 | Moret et al. | |
| 5,580,144 A | | 12/1996 | Stroomer | |
| 5,581,272 A | | 12/1996 | Conner et al. | |
| 5,583,534 A | * | 12/1996 | Katakura et al. | 345/97 |
| 5,583,688 A | | 12/1996 | Hornbeck | |
| 5,589,852 A | | 12/1996 | Thompson et al. | |
| 5,591,379 A | | 1/1997 | Shores | |
| 5,597,736 A | | 1/1997 | Sampsell | |
| 5,600,383 A | | 2/1997 | Hornbeck | |
| 5,602,671 A | | 2/1997 | Hornbeck | |
| 5,606,441 A | | 2/1997 | Florence et al. | |

| | | | | |
|---|---|---|---|---|
| 5,608,468 | A | 3/1997 | Gove et al. | |
| 5,610,438 | A | 3/1997 | Wallace et al. | |
| 5,610,624 | A | 3/1997 | Bhuva | |
| 5,610,625 | A | 3/1997 | Sampsell | |
| 5,619,059 | A | 4/1997 | Li et al. | |
| 5,619,365 | A | 4/1997 | Rhoades et al. | |
| 5,619,366 | A | 4/1997 | Rhoads et al. | |
| 5,629,521 | A | 5/1997 | Lee et al. | |
| 5,629,790 | A | 5/1997 | Neukermans et al. | |
| 5,636,052 | A | 6/1997 | Arney et al. | |
| 5,636,185 | A | 6/1997 | Brewer et al. | |
| 5,646,768 | A | 7/1997 | Kaeriyama | |
| 5,650,881 | A | 7/1997 | Hornbeck | |
| 5,654,741 | A | 8/1997 | Sampsell et al. | |
| 5,657,099 | A | 8/1997 | Doherty et al. | |
| 5,659,374 | A | 8/1997 | Gale, Jr. et al. | |
| 5,665,997 | A | 9/1997 | Weaver et al. | |
| 5,673,139 | A | 9/1997 | Johnson | |
| 5,683,591 | A | 11/1997 | Offenberg | |
| 5,699,074 | A | 12/1997 | Sutherland et al. | |
| 5,703,710 | A | 12/1997 | Brinkman et al. | |
| 5,710,656 | A | 1/1998 | Goosen | |
| 5,726,480 | A | 3/1998 | Pister | |
| 5,739,945 | A | 4/1998 | Tayebati | |
| 5,745,193 | A | 4/1998 | Urbanus et al. | |
| 5,745,281 | A | 4/1998 | Yi et al. | |
| 5,771,116 | A | 6/1998 | Miller et al. | |
| 5,784,190 | A | 7/1998 | Worley | |
| 5,784,212 | A | 7/1998 | Hornbeck | |
| 5,793,504 | A | 8/1998 | Stoll | |
| 5,808,780 | A | 9/1998 | McDonald | |
| 5,815,141 | A | 9/1998 | Phares | |
| 5,818,095 | A | 10/1998 | Sampsell | |
| 5,825,528 | A | 10/1998 | Goosen | |
| 5,835,255 | A | 11/1998 | Miles | |
| 5,842,088 | A | 11/1998 | Thompson | |
| 5,909,205 | A | 6/1999 | Furuhashi et al. | |
| 5,912,758 | A | 6/1999 | Knipe et al. | |
| 5,936,668 | A | 8/1999 | Sawanobori et al. | |
| 5,943,158 | A | 8/1999 | Ford et al. | |
| 5,945,980 | A | 8/1999 | Moissev et al. | |
| 5,952,990 | A * | 9/1999 | Inoue et al. | 345/97 |
| 5,977,945 | A | 11/1999 | Ohshima | |
| 5,986,796 | A | 11/1999 | Miles | |
| 6,014,121 | A * | 1/2000 | Aratani et al. | 345/89 |
| 6,028,690 | A | 2/2000 | Carter et al. | |
| 6,038,056 | A | 3/2000 | Florence et al. | |
| 6,040,937 | A | 3/2000 | Miles | |
| 6,049,317 | A | 4/2000 | Thompson et al. | |
| 6,055,090 | A | 4/2000 | Miles | |
| 6,061,075 | A | 5/2000 | Nelson et al. | |
| 6,078,316 | A * | 6/2000 | Page et al. | 345/204 |
| 6,099,132 | A | 8/2000 | Kaeriyama | |
| 6,100,872 | A | 8/2000 | Aratani et al. | |
| 6,113,239 | A | 9/2000 | Sampsell et al. | |
| 6,147,790 | A | 11/2000 | Meier et al. | |
| 6,160,833 | A | 12/2000 | Floyd et al. | |
| 6,180,428 | B1 | 1/2001 | Peeters et al. | |
| 6,201,633 | B1 | 3/2001 | Peeters et al. | |
| 6,222,511 | B1 | 4/2001 | Stoller et al. | |
| 6,222,518 | B1 * | 4/2001 | Ikeda et al. | 345/98 |
| 6,232,936 | B1 | 5/2001 | Gove et al. | |
| 6,242,989 | B1 | 6/2001 | Barber et al. | |
| 6,243,149 | B1 | 6/2001 | Swanson et al. | |
| 6,252,991 | B1 | 6/2001 | Uchio et al. | |
| 6,275,220 | B1 | 8/2001 | Nitta | |
| 6,282,010 | B1 | 8/2001 | Sulzbach et al. | |
| 6,295,048 | B1 | 9/2001 | Ward et al. | |
| 6,295,154 | B1 | 9/2001 | Laor et al. | |
| 6,300,921 | B1 * | 10/2001 | Moriconi et al. | 345/30 |
| 6,304,297 | B1 | 10/2001 | Swan | |
| 6,307,194 | B1 | 10/2001 | Fitzgibbons et al. | |
| 6,323,982 | B1 | 11/2001 | Hornbeck | |
| 6,329,973 | B1 | 12/2001 | Hitachi et al. | |
| 6,339,417 | B1 | 1/2002 | Quanrud | |
| 6,395,863 | B2 | 5/2002 | Geaghan | |
| 6,424,094 | B1 | 7/2002 | Feldman | |
| 6,447,126 | B1 | 9/2002 | Hornbeck | |
| 6,465,355 | B1 | 10/2002 | Horsley | |
| 6,466,354 | B1 | 10/2002 | Gudeman | |
| 6,466,358 | B2 | 10/2002 | Tew | |
| 6,473,072 | B1 | 10/2002 | Comiskey et al. | |
| 6,473,274 | B1 | 10/2002 | Maimone et al. | |
| 6,480,177 | B2 | 11/2002 | Doherty et al. | |
| 6,484,011 | B1 | 11/2002 | Thompson et al. | |
| 6,496,122 | B2 | 12/2002 | Sampsell | |
| 6,522,794 | B1 | 2/2003 | Bischel et al. | |
| 6,545,335 | B1 | 4/2003 | Chua et al. | |
| 6,548,908 | B2 | 4/2003 | Chua et al. | |
| 6,549,195 | B2 | 4/2003 | Hikida et al. | |
| 6,549,338 | B1 | 4/2003 | Wolverton et al. | |
| 6,552,840 | B2 | 4/2003 | Knipe | |
| 6,574,033 | B1 | 6/2003 | Chui et al. | |
| 6,589,625 | B1 | 7/2003 | Kothari et al. | |
| 6,600,201 | B2 | 7/2003 | Hartwell et al. | |
| 6,606,175 | B1 | 8/2003 | Sampsell et al. | |
| 6,625,047 | B2 | 9/2003 | Coleman, Jr. | |
| 6,630,786 | B2 | 10/2003 | Cummings et al. | |
| 6,632,698 | B2 | 10/2003 | Ives | |
| 6,643,069 | B2 | 11/2003 | Dewald | |
| 6,650,455 | B2 | 11/2003 | Miles | |
| 6,666,561 | B1 | 12/2003 | Blakley | |
| 6,674,090 | B1 | 1/2004 | Chua et al. | |
| 6,674,562 | B1 | 1/2004 | Miles et al. | |
| 6,680,792 | B2 | 1/2004 | Miles | |
| 6,710,908 | B2 | 3/2004 | Miles et al. | |
| 6,737,979 | B1 | 5/2004 | Smith et al. | |
| 6,741,377 | B2 | 5/2004 | Miles | |
| 6,741,384 | B1 | 5/2004 | Martin et al. | |
| 6,741,503 | B1 | 5/2004 | Farris et al. | |
| 6,747,785 | B2 | 6/2004 | Chen et al. | |
| 6,747,800 | B1 | 6/2004 | Lin | |
| 6,762,873 | B1 | 7/2004 | Coker et al. | |
| 6,775,174 | B2 | 8/2004 | Huffman et al. | |
| 6,778,155 | B2 | 8/2004 | Doherty et al. | |
| 6,794,119 | B2 | 9/2004 | Miles | |
| 6,811,267 | B1 | 11/2004 | Allen et al. | |
| 6,819,469 | B1 | 11/2004 | Koba | |
| 6,822,628 | B2 | 11/2004 | Dunphy et al. | |
| 6,829,132 | B2 | 12/2004 | Martin et al. | |
| 6,853,129 | B1 | 2/2005 | Cummings et al. | |
| 6,855,610 | B2 | 2/2005 | Tung et al. | |
| 6,859,218 | B1 | 2/2005 | Luman et al. | |
| 6,861,277 | B1 | 3/2005 | Monroe et al. | |
| 6,862,022 | B2 | 3/2005 | Slupe | |
| 6,862,029 | B1 | 3/2005 | D'Souza et al. | |
| 6,867,896 | B2 | 3/2005 | Miles | |
| 6,870,581 | B2 | 3/2005 | Li et al. | |
| 6,870,654 | B2 | 3/2005 | Lin et al. | |
| 6,882,458 | B2 | 4/2005 | Lin et al. | |
| 6,882,461 | B1 | 4/2005 | Tsai et al. | |
| 6,912,022 | B2 | 6/2005 | Lin et al. | |
| 6,914,586 | B2 * | 7/2005 | Burkhardt | 345/87 |
| 6,952,303 | B2 | 10/2005 | Lin et al. | |
| 6,958,847 | B2 | 10/2005 | Lin | |
| 7,123,216 | B1 | 10/2006 | Miles | |
| 7,138,984 | B1 | 11/2006 | Miles | |
| 7,280,265 | B2 | 10/2007 | Miles | |
| 7,586,484 | B2 | 9/2009 | Sampsell et al. | |
| 2001/0003487 | A1 | 6/2001 | Miles | |
| 2001/0040538 | A1 | 11/2001 | Quanrud | |
| 2001/0050666 | A1 | 12/2001 | Huang et al. | |
| 2002/0012159 | A1 | 1/2002 | Tew | |
| 2002/0015215 | A1 | 2/2002 | Miles | |
| 2002/0024711 | A1 | 2/2002 | Miles | |
| 2002/0041264 | A1 | 4/2002 | Quanrud | |
| 2002/0054424 | A1 | 5/2002 | Miles | |
| 2002/0075555 | A1 | 6/2002 | Miles | |
| 2002/0126364 | A1 | 9/2002 | Miles | |
| 2002/0149828 | A1 | 10/2002 | Miles | |
| 2002/0171610 | A1 | 11/2002 | Siwinski et al. | |
| 2002/0175284 | A1 | 11/2002 | Vilain | |
| 2002/0181208 | A1 | 12/2002 | Credelle et al. | |
| 2002/0186209 | A1 | 12/2002 | Cok | |
| 2003/0004272 | A1 | 1/2003 | Power | |
| 2003/0020699 | A1 | 1/2003 | Hironori et al. | |
| 2003/0043157 | A1 | 3/2003 | Miles | |
| 2003/0072070 | A1 | 4/2003 | Miles | |

| | | | |
|---|---|---|---|
| 2003/0107805 | A1 | 6/2003 | Street |
| 2003/0112507 | A1 | 6/2003 | Divelbiss et al. |
| 2003/0117382 | A1 | 6/2003 | Pawlowski et al. |
| 2003/0122773 | A1 | 7/2003 | Washio |
| 2003/0128197 | A1 | 7/2003 | Turner et al. |
| 2003/0141453 | A1 | 7/2003 | Reed et al. |
| 2003/0173504 | A1 | 9/2003 | Cole et al. |
| 2003/0202264 | A1 | 10/2003 | Weber et al. |
| 2003/0202265 | A1 | 10/2003 | Reboa et al. |
| 2003/0202266 | A1 | 10/2003 | Ring et al. |
| 2004/0024580 | A1 | 2/2004 | Salmonsen et al. |
| 2004/0027324 | A1 | 2/2004 | Furuhashi et al. |
| 2004/0051929 | A1 | 3/2004 | Sampsell et al. |
| 2004/0058532 | A1 | 3/2004 | Miles et al. |
| 2004/0080807 | A1 | 4/2004 | Chen et al. |
| 2004/0125281 | A1 | 7/2004 | Lin et al. |
| 2004/0145049 | A1 | 7/2004 | McKinnell et al. |
| 2004/0145811 | A1 | 7/2004 | Lin et al. |
| 2004/0147056 | A1 | 7/2004 | McKinnell et al. |
| 2004/0147198 | A1 | 7/2004 | Lin et al. |
| 2004/0150939 | A1 | 8/2004 | Huff |
| 2004/0160143 | A1 | 8/2004 | Shreeve et al. |
| 2004/0174583 | A1 | 9/2004 | Chen et al. |
| 2004/0175577 | A1 | 9/2004 | Lin et al. |
| 2004/0179281 | A1 | 9/2004 | Reboa |
| 2004/0207897 | A1 | 10/2004 | Lin |
| 2004/0209192 | A1 | 10/2004 | Lin et al. |
| 2004/0209195 | A1 | 10/2004 | Lin |
| 2004/0212026 | A1 | 10/2004 | Van Brocklin et al. |
| 2004/0217378 | A1 | 11/2004 | Martin et al. |
| 2004/0217919 | A1 | 11/2004 | Pichl et al. |
| 2004/0218251 | A1 | 11/2004 | Piehl et al. |
| 2004/0218334 | A1 | 11/2004 | Martin et al. |
| 2004/0218341 | A1 | 11/2004 | Martin et al. |
| 2004/0227493 | A1 | 11/2004 | Van Brocklin et al. |
| 2004/0240032 | A1 | 12/2004 | Miles |
| 2004/0240138 | A1 | 12/2004 | Martin et al. |
| 2004/0245588 | A1 | 12/2004 | Nikkel et al. |
| 2004/0263944 | A1 | 12/2004 | Miles et al. |
| 2005/0001797 | A1 | 1/2005 | Miller et al. |
| 2005/0001828 | A1 | 1/2005 | Martin et al. |
| 2005/0002082 | A1 | 1/2005 | Miles |
| 2005/0003667 | A1 | 1/2005 | Lin et al. |
| 2005/0017177 | A1 | 1/2005 | Tai et al. |
| 2005/0017942 | A1 | 1/2005 | Tsujino et al. |
| 2005/0024557 | A1 | 2/2005 | Lin |
| 2005/0035699 | A1 | 2/2005 | Tsai |
| 2005/0036095 | A1 | 2/2005 | Yeh et al. |
| 2005/0036192 | A1 | 2/2005 | Lin et al. |
| 2005/0038950 | A1 | 2/2005 | Adelmann |
| 2005/0042117 | A1 | 2/2005 | Lin |
| 2005/0046922 | A1 | 3/2005 | Lin et al. |
| 2005/0046948 | A1 | 3/2005 | Lin |
| 2005/0057442 | A1 | 3/2005 | Way |
| 2005/0068254 | A1 | 3/2005 | Booth |
| 2005/0068583 | A1 | 3/2005 | Gutkowski et al. |
| 2005/0068605 | A1 | 3/2005 | Tsai |
| 2005/0068606 | A1 | 3/2005 | Tsai |
| 2005/0069209 | A1 | 3/2005 | Damera-Venkata et al. |
| 2005/0078348 | A1 | 4/2005 | Lin |
| 2005/0168849 | A1 | 8/2005 | Lin |
| 2005/0195462 | A1 | 9/2005 | Lin |
| 2005/0202649 | A1 | 9/2005 | Hung et al. |
| 2005/0219272 | A1 | 10/2005 | Johnson et al. |
| 2005/0253820 | A1 | 11/2005 | Horiuchi |
| 2006/0066503 | A1* | 3/2006 | Sampsell et al. ............... 345/1.1 |
| 2006/0066596 | A1* | 3/2006 | Sampsell et al. .............. 345/204 |
| 2006/0066601 | A1* | 3/2006 | Kothari et al. ................ 345/204 |
| 2006/0077127 | A1* | 4/2006 | Sampsell et al. ................ 345/55 |
| 2006/0139308 | A1 | 6/2006 | Jacobson et al. |
| 2006/0151601 | A1 | 7/2006 | Rosenfeld et al. |
| 2006/0176241 | A1* | 8/2006 | Sampsell ....................... 345/2.1 |
| 2007/0023851 | A1 | 2/2007 | Hartzell et al. |
| 2007/0070028 | A1 | 3/2007 | Zhou et al. |

FOREIGN PATENT DOCUMENTS

| | | | |
|---|---|---|---|
| EP | 0 584 358 | | 3/1994 |
| EP | 0 602 623 | | 6/1994 |
| EP | 0608056 | A1 | 7/1994 |
| EP | 0 649 010 | | 4/1995 |
| EP | 0667548 | | 8/1995 |
| EP | 0 725 380 | | 8/1996 |
| EP | 0986077 | A2 | 3/2000 |
| EP | 1067805 | A2 | 1/2001 |
| EP | 1 134 721 | | 9/2001 |
| JP | 56-092494 | | 7/1981 |
| JP | 3109524 | A | 5/1991 |
| JP | 405275401 | | 10/1993 |
| JP | 07-005860 | | 1/1994 |
| JP | 06-051721 | | 2/1994 |
| JP | 09-152848 | | 6/1997 |
| JP | 10161630 | A | 6/1998 |
| JP | 2000-112435 | | 4/2000 |
| JP | 2000-352943 | | 5/2000 |
| JP | 2001-222276 | | 8/2001 |
| JP | 2001-242818 | | 9/2001 |
| JP | 2001-331146 | | 11/2001 |
| JP | 2002-006818 | | 1/2002 |
| JP | 2002-287681 | | 10/2002 |
| JP | 2003 044011 | | 2/2003 |
| JP | 2003-241720 | | 8/2003 |
| JP | 2003-248468 | | 9/2003 |
| JP | 2003-330433 | | 11/2003 |
| JP | 2004-029232 | | 1/2004 |
| JP | 2004 088349 | | 3/2004 |
| JP | 2004-088349 | | 3/2004 |
| JP | 2004-151222 | | 5/2004 |
| JP | 2004-170475 | | 6/2004 |
| JP | 2004-177784 | | 6/2004 |
| JP | 2004-205825 | | 7/2004 |
| TW | 157313 | | 5/1991 |
| WO | WO 94/29840 | A1 | 12/1994 |
| WO | WO 95/30924 | | 11/1995 |
| WO | WO 97/11447 | | 3/1997 |
| WO | WO 97/17628 | | 5/1997 |
| WO | WO 98/44477 | | 10/1998 |
| WO | WO 00/25169 | | 5/1999 |
| WO | WO 99/52006 | A2 | 10/1999 |
| WO | WO 99/52006 | A3 | 10/1999 |
| WO | WO 00/41161 | | 7/2000 |
| WO | WO 02/063602 | A1 | 8/2002 |
| WO | WO 03/007049 | | 1/2003 |
| WO | WO 03/007049 | A1 | 1/2003 |
| WO | WO 03/069413 | A1 | 8/2003 |
| WO | WO 03/073151 | A1 | 9/2003 |
| WO | WO 03/100514 | | 12/2003 |
| WO | WO 2004/006003 | A1 | 1/2004 |
| WO | WO 2004/026757 | A2 | 4/2004 |
| WO | WO 2004/066254 | | 8/2004 |
| WO | WO 2004/066256 | | 8/2004 |
| WO | WO 2004/075526 | A2 | 9/2004 |
| WO | WO 2004/095409 | | 11/2004 |

OTHER PUBLICATIONS

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani et al., "Surface Micromachined Tuneable Interferometer Array," Sensors and Actuators, pp. 17-23 (1994).

Billard, C.; "Tunable Capacitor," 5h Annual Review of LETI, Jun. 24, 2003, p. 7.

Bouchaud, Jeremie; Wicht, Henning; "RF Memes Analysis, Forecasts and Technology Review," Chip Unaxis, date unknown, [online] retrieved from the Internet: <URL:http://semiconductors.unaxis.com/en/download/RF%20MEMS.pdf>.

Chan et al., "Low-Actuation Voltage RF MEMS Shunt Switch With Cold Switching Lifetime of Seven Billion Cycles," Journal of Microelectromechanical Systems vol. 12, No. 5 (Oct 2003).

Conner, "Hybrid Color Display Using Optical Interference Filter Array," SID Digest, pp. 577-580 (1993).

De Coster et al., "Variable RF Mems Capacitors With Extended Tuning Range", IEEE International Solid-State Sensors and Actuators Conference, Boston, (Jun. 8-12, 2003).

Goossen et al., "Possible Display Applications of the Silicon Mechanical Anti-Reflection Switch," Society for Information Display (1994).

Goossen et al., "Silicon Modulator Based on Mechanically-Active Anti-Reflection Layer with 1Mbit/sec Capability for Fiber-in-the-Loop Applications," IEEE Photonics Technology Letters (Sep. 1994).
Gosch, "West Germany Grabs the Lead in X-Ray Lithography," Electronics, pp. 78-80 (Feb. 5, 1987).
Heines et al, "Bi-Stable Flat-Panel Display Based on a 180 [DEG.] Flipping Pixel", Conference: Displays IX: Displays for Defense Applications, (Apr. 2-5, 2002), Proceedings of the SPIE: The International Society for Optical Engineering, vol. 4712, pp. 327-335.
Howard et al., "Nanometer-Scale Fabrication Techniques," VLSI Electronics: Microstructure Science, vol. 5, pp. 145-153 and pp. 166-173 (1982).
Jackson, "Classical Electrodynamics," John Wiley & Sons Inc., pp. 568-573 (date unknown).
Jerman et al., "A Miniature Fabry-Perot Interferometer with a Corrugated Silicon Diaphragm Support," IEEE Electron Devices Society (1988).
Johnson "Optical Scanners," Microwave Scanning Antennas, vol. 1, pp. 251-261 (1964).
Li, G.P. "On the design and Fabrication of Electrostatic RF MEMS Switches," Final Report 1999-00 for MICRO Project 99-071, University of California, Irvine.
Light over Matter, Circle No. 36 (Jun. 1993).
Mait, "Design of Diffractive Optical Elements for Optical Signal Processing", IEEE Lasers and Electro-Optics Society Annual Meeting, pp. 59-60, (Nov. 15-18, 1993).
Miles, "A New Reflective FPD Technology Using Interferometric Modulation," Society for Information Display '97 Digest, Session 7.3.
Newsbreaks, "Quantum-trench devices might operate at terahertz frequencies," Laser Focus World (May 1993).
Nieminen, Heikki, Ermolov, Vladimir; Silanto, Samuli; Nybergh, Kjell; Rhanen, Tapani; "Design of a Temperature-Stable RF MEM Capacitor," Institute of Electrical and Electronics Engineers (IEEE) Journal of Microelectromechanical Systems, vol. 13, No. 5, Oct. 2004, pp. 705-714.
Oliner et al., "Radiating Elements and Mutual Coupling," Microwave Scanning Antennas, vol. 2, p. 131-194 (1966).
Oz et al., "CMOS-Compatible RF-MEMS Tunable Capacitors", IEEE MTT-S International Microwave Symposium—IMS 2003, (Jun. 8-13, 2003).
Pacheco et al. "Design of Low Actuation Voltage RF MEMS Switch" Radiation Laboratory and Center for Microsystems Department of Electrical Engineering and Computer Science University of Michigan, IEEE (2000) 0-7803-5687-X/00/.
Raley et al., "A Fabry-Perot Microinterferometer for Visible Wavelengths," IEEE Solid-State Sensor and Actuator Workshop, Hilton Head, SC (1992).
Solgaard et al., "Interference-Based Optical MEMS Filters", Optical 2004 Fiber Communication Conference, vol. 1, (Feb. 23-27, 2004).
Sperger et al., "High Performance Patterned All-Dielectric Interference Colour Filter for Display Applications," SID Digest, pp. 81-83 (1994).
Stone, "Radiation and Optics, An Introduction to the Classical Theory," McGraw-Hill, pp. 340-343 (1963).
Tan et al. "RF MEMS Simulation-High Isolation CPW Shunt Switches", Ansoft: Global Seminars: Delivering Performance (2003).
Vähä-Heikkilä et al. "Design of Capacitive RF MEMS Power Sensor" VTT Information Technology, (2002), available at <http://www.hut.fi/Units/Radio/URSI02/ursi_vaha-heikkila.pdf>.
Walker, et al., "Electron-beam-tunable Interference Filter Spatial Light Modulator," Optics Letters vol. 13, No. 5, pp. 345-347 (May 1988).
Wang et al., "Design and Fabrication of a Novel Two-Dimension MEMS-Based Tunable Capacitor", IEEE 2002 International Conference on Communications, Circuits and Systems and West Sino Expositions, vol. 2, pp. 1766-1769, (Jun. 29-Jul. 1, 2002).
Winton, John M., "A novel way to capture solar energy," Chemical Week, pp. 17-18 (May 15, 1985).
Wu, "Design of a Reflective Color LCD Using Optical Interference Reflectors," ASIA Display '95, pp. 929-931 (Oct. 16, 1995).
Bass, "Handbook of Optics, vol. 1, Fundamentals, Techniques, and Design, Second Edition," McGraw-Hill, Inc., New York, pp. 2.29-2.36 (1995).
Ibotson, et al. "Comparison of XeF2, and F-atom reactions with Si and Si02, Applied Physics Letters." vol. 44, No. 12, Jun. 1984. pp. 1129-1131.
Schnakenberg, et al. "THAHW Etchants for Silicon Micromachining." 1991 International Conference on Solid State Sensors and Actuators—Digest of Technical Papers. pp. 815-818.
Williams, et al. Etch Rates for Michromachining Processing—Journal of Microelectromechanical Systems. vol. 5 No. 4, Dec. 1996, pp. 256-269.
Winters, et al., "The Etching of Silicon with XeF2 Vapor." Applied Physics Letters, vol. 34. No. 1, Jan. 1979, pp. 70-73.
Austrian Search Report from U.S. Appl. No. 11/097,509, Jul. 14, 2005.
Austrian Search Report from U.S. Appl. No. 11/097,509, Jul. 29, 2005.
Austrian Search Report from U.S. Appl. No. 11/096,546, May 19, 2005.
Austrian Search Report from U.S. Appl. No. 11/140,560, Aug. 11, 2005.
Austrian Search Report from U.S. Appl. No. 11/066,724, May 13, 2005.
Austrian Search Report from U.S. Appl. No. 11/097,818, Jul. 14, 2005.
Austrian Search Report from U.S. Appl. No. 11/097,820, Jun. 29, 2005.
Miles, "MEMS-based interferometric modulator for display applications," Proceedings of SPIE, vol. 3876, Aug. 1999, pp. 20-28.
Miles et al., 10.1: Digital PaperTM for reflective displays, SID 02 Digest, pp. 115-117, 2002.
NEC Corporation, MOS Integrated Circuit µPD16180, Preliminary Product Information, Apr. 2003.
Sato et al. A .9 m-pixel poly-Si TFT-LDC for HD and computer-data projectors, IEEE Transactions on Consumer Electronics, 41(4):1181-1187, Nov. 1995.
Partial European Search Report for App. No. 05255683.4, dated Jul. 9, 2008.
Office Action dated May 9, 2008 in Chinese App. No. 200510103556.4.
Extended European Search Report for App. No. 05255683.4, dated Sep. 26, 2008.
Office Action dated Mar. 3, 2009 for Japanese Patent Application No. 2005-237331.
Official Communication for App. No. 05255683.4, dated Sep. 30, 2009.
Notice for Reasons for Rejection dated Mar. 3, 3009 in Japanese App. No. 2005-237331.

* cited by examiner

| Row Output Signals | Column Output Signals: $+V_{bias}$ | Column Output Signals: $-V_{bias}$ |
|---|---|---|
| 0 | Stable | Stable |
| $+\Delta V$ | Release | Actuate |
| $-\Delta V$ | Actuate | Release |

METHOD AND SYSTEM FOR DRIVING A BI-STABLE DISPLAY

CROSS REFERENCE TO RELATED APPLICATIONS

This application claims priority to U.S. Provisional Application No. 60/613,407 titled "Method And System For Server Controlled Display Partitioning And Refresh Rate," filed Sep. 27, 2004, which is incorporated by reference, in its entirety. This application is related to U.S. application Ser. No. 11/097,819, titled "Controller And Driver Features For Bi-Stable Display," filed on even date herewith, U.S. application Ser. No. 11/096,546, titled "System Having Different Update Rates For Different Portions Of A Partitioned Display," filed on even date herewith, and U.S. application Ser. No. 11/097,509, titled "System With Server Based Control Of Client Display Features," filed on even date herewith, U.S. application Ser. No. 11/097,820, titled "System and Method of Transmitting Video Data," filed on even data herewith, and U.S. application Ser. No. 11/097,818, titled "System and Method of Transmitting Video Data," filed on even date herewith, all of which are incorporated herein by reference, in their entirety, and assigned to the assignee of the present invention.

BACKGROUND

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. An interferometric modulator may comprise a pair of conductive plates, one or both of which may be transparent and/or reflective in whole or part and capable of relative motion upon application of an appropriate electrical signal. One plate may comprise a stationary layer deposited on a substrate, the other plate may comprise a metallic membrane separated from the stationary layer by an air gap. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

A first embodiment includes a system that is configured to display video data on an array of bi-stable display elements, the system including a processor configured to receive video data, a display comprising an array of bi-stable display elements, a driver controller in data communication with the processor and configured to receive video data from the processor, and an array driver configured to receive video data from the driver controller and receive display signals from the processor, and further configured to display the video data on the array of bi-stable display elements using the display signals. In one aspect of the first embodiment, the array of bi-stable display elements comprises interferometric modulators. In a second aspect of the first embodiment, the display signals control a rate of displaying the video data on the array of bi-stable display elements. In a third aspect of the first embodiment, the display signals comprise instructions that are used by the array driver to control a drive scheme for the array of bi-stable display elements. In a fourth aspect of the first embodiment, the array driver receives region information from the processor that identifies a group of bi-stable display elements of the array of bi-stable display elements, and wherein the display signals are used to control a refresh rate for the identified group of bi-stable display elements. In a fifth aspect of the first embodiment, the driver controller is a non-bi-stable display driver controller. In a sixth aspect, the array driver is configured to partition the array into one or more regions based on the display signals. In a seventh aspect, the array driver is configured to display the video data in an interlaced format.

A second embodiment includes a system for displaying video data on an array of bi-stable display elements, the system including a processor, a display comprising an array of bi-stable display elements, a driver controller connected to the processor, the driver controller configured to receive video data from the processor and provide the video data and display signals for displaying the video data on the array of bi-stable display elements, and an array driver connected to the driver controller and the display, the array driver configured to receive the video data and display signals from the driver controller, and to display the video data on the array of bi-stable display elements using the display signals. In a first aspect of the second embodiment, the array of bi-stable display elements comprises interferometric display elements. In a second aspect of the second embodiment, the display signals control a rate of displaying the video data on the array of bi-stable display elements. In a third aspect of the second embodiment, the array driver receives region information from the processor that identifies a group of bi-stable display elements of the array of bi-stable display elements, and wherein the display signals are used to control a refresh rate for the identified group of bi-stable display elements. In a fourth aspect of the second embodiment, the display signals comprise instructions that are used by the array driver to control a drive scheme for the array of bi-stable display elements. In a fifth aspect, the array driver is configured to partition the array into one or more regions based on the display signals. In a sixth aspect, the array driver is configured to display the video data in an interlaced format.

A third embodiment includes a method of displaying data including transmitting display signals from a processor to a driver of an array of bi-stable display elements, and updating an image displayed on the array of bi-stable display elements, wherein the updating is based on signals from the driver and performed on a periodic basis that is based at least in part upon the transmitted display signals. In a first aspect of the third embodiment, the method also includes determining a display rate of video data, and generating display signals based at least in part upon the determined display rate. In a second aspect of the third embodiment, the method also includes executing at least part of the transmitted display signals, wherein the executed display signals operate to control the frequency at which the image displayed by the array of bi-stable display elements is updated. In a third aspect of the third embodiment, the method also includes partitioning the array into one or more groups of bi-stable display elements using information contained in the display signals, where updating an image displayed comprises updating the images displayed on the one or more groups of bi-stable display elements of the array, wherein each of the one or more groups is updated at a refresh rate using information contained in the display signals. In a fourth aspect of the third embodiment, the display signals are transmitted from a driver controller to an array driver. In a fifth aspect of the third embodiment, the display signals are transmitted from a processor to an array driver. In a sixth aspect of the third embodiment, the array of bi-stable display elements comprises interferometric modulators. In a seventh aspect of the third embodiment, updating an image displayed on the array comprises displaying the image in an interlaced format.

A fourth embodiment includes a system for displaying video data on a bi-stable display, including means for transmitting display signals from a processor to a driver of an array of bi-stable display elements, and means for updating an image displayed by the array of bi-stable display elements, wherein the updating is based on the transmitted display signals. In a first aspect of the fourth embodiment, the array of bi-stable display elements comprise interferometric modulators. In a second aspect of the fourth embodiment, the system additionally includes means for determining a display rate of video data, and means for generating display signals based at least in part upon the determined display rate. In a third aspect of the fourth embodiment, the system also includes means for transmitting region information identifying a group of the interferometric modulators, where updating the image that is displayed is performed for the group of bi-stable display elements. In a fourth aspect of the fourth embodiment, the display signals are transmitted from a driver controller to an array driver. A fifth aspect of the fourth embodiment additionally includes means for executing at least part of the transmitted refresh instructions, wherein the executed instructions operate to control the frequency at which the image that is displayed by the array of bi-stable display elements is updated. And in a sixth aspect of the fourth embodiment, the display signals are transmitted from a processor to an array driver.

DETAILED DESCRIPTION OF CERTAIN EMBODIMENTS

Figure 1:
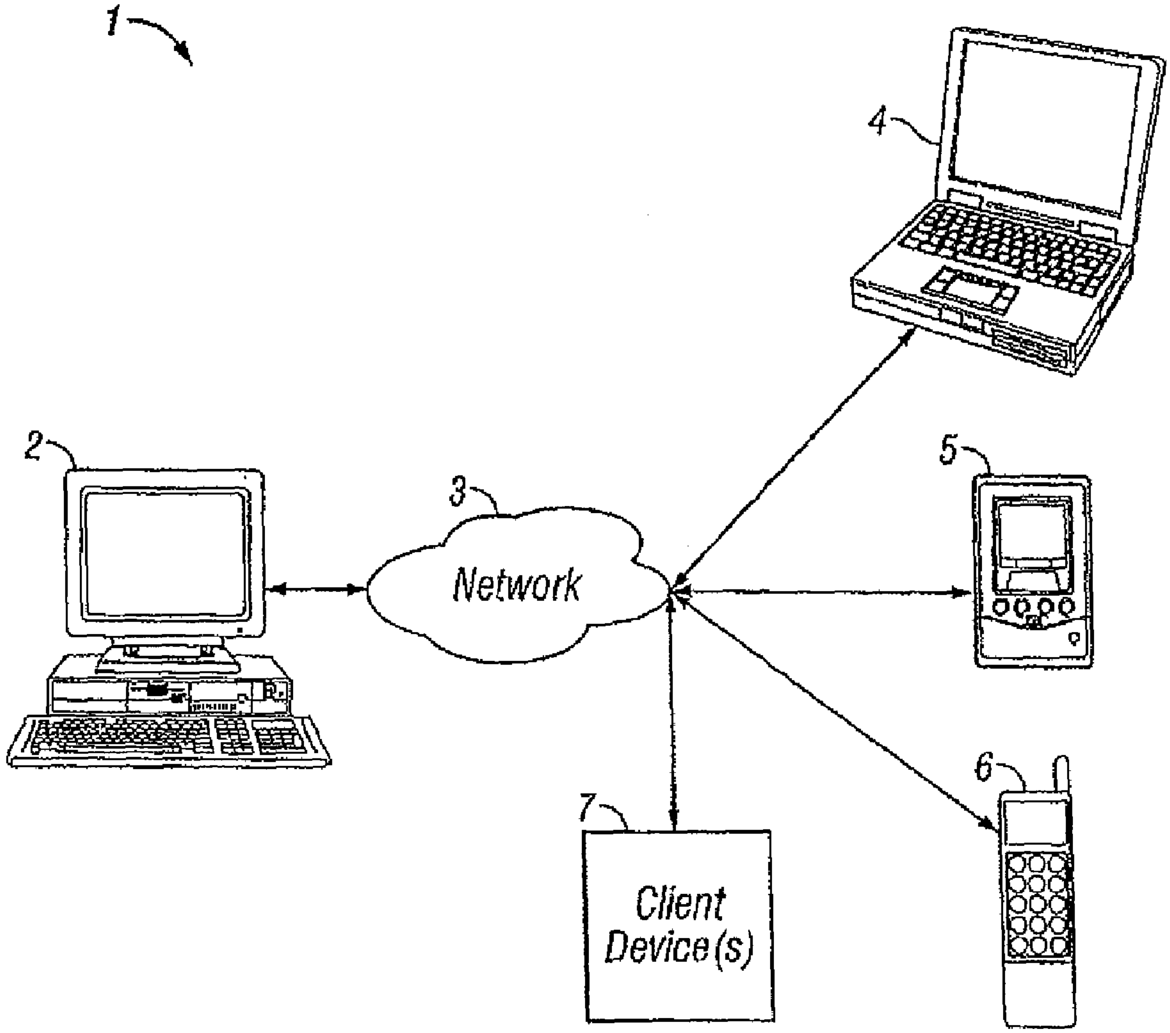
FIG. 1 illustrates a networked system of one embodiment.

The following detailed description is directed to certain specific embodiments. However, the invention can be embodied in a multitude of different ways. Reference in this specification to "one embodiment" or "an embodiment" means that a particular feature, structure, or characteristic described in connection with the embodiment is included in at least one embodiment. The appearances of the phrase "in one embodiment," "according to one embodiment," or "in some embodiments" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, a display array on a device includes at least one driving circuit and an array of means, e.g., interferometric modulators, on which video data is displayed. Video data, as used herein, refers to any kind of displayable data, including pictures, graphics, and words, displayable in either static or dynamic images (for example, a series of video frames that when viewed give the appearance of movement, e.g., a continuous ever-changing display of stock quotes, a "video clip", or data indicating the occurrence of an event of action). Video data, as used herein, also refers to any kind of control data, including instructions on how the video data is to be processed (display mode), such as frame rate, and data format. The array is driven by the driving circuit to display video data.

The currently available flat panel display controllers and drivers (for example, for LCD's and plasma displays) have been designed to work with displays that need to be constantly refreshed in order to display a viewable image. Another type of display comprises an array of bi-stable display elements. Images rendered on an array of bi-stable elements are viewable for a long period of time without having to constantly refresh the display, and require relatively low power to maintain the displayed image. In such displays, a variety of refresh and update processes can be used that take advantage of the bi-stable display elements characteristics to decrease the power requirements of the display. If an array of bi-stable display elements are operated by the controllers and drivers that are used with current flat panel displays and are not configured to utilize the characteristics of a bi-stable display element, the advantageous refresh and update processes cannot be used and power requirements for driving the display may not be optimally reduced. Thus, improved controller and driver systems and methods for use with bi-stable displays are desired. For bi-stable display elements, including the interferometric modulators described herein, these improved controllers and drivers can implement refresh and update processes that take advantage of the unique capabilities of bi-stable display elements.

In one embodiment, a system is disclosed for displaying video data on a client device (for example, a mobile phone) that includes a display array of interferometric modulators. The system uses a typical driver controller to provide video data to an array driver. The array driver is also connected to a processor, which is configured to implement one or more specialized display processes for driving the array display, and send corresponding signals to the array driver. The array driver is configured to receive video data from the driver controller and display signals from the processor, and to display the video data on the array of interferometric modulators using the display signals. Display signals, as referred to herein, include instructions, information, data, or signals that are used by the array driver to display the video data. In another embodiment, a system is disclosed for displaying video data on an array of interferometric modulators using a bi-stable driver controller. In this system, the driver controller is configured to receive video data from the processor and provide the video data and display signals to an array driver for displaying the video data on the array of interferometric modulators. In alternative embodiments, the array driver can receive display signals from a server communicating with the client device. In some embodiments, the display signals from the server can be communicated to the array driver through a connection between the array driver and a network interface that communicates with the server. In other embodiments, the server communicates the display signals to the array driver via the processor in the client device.

In this description, reference is made to the drawings wherein like parts are designated with like numerals throughout. The invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Spatial light modulators used for imaging applications come in many different forms. Transmissive liquid crystal display (LCD) modulators modulate light by controlling the twist and/or alignment of crystalline materials to block or pass light. Reflective spatial light modulators exploit various physical effects to control the amount of light reflected to the imaging surface. Examples of such reflective modulators include reflective LCDs, and digital micromirror devices.

Another example of a spatial light modulator is an interferometric modulator that modulates light by interference. Interferometric modulators are bi-stable display elements which employ a resonant optical cavity having at least one movable or deflectable wall. Constructive interference in the optical cavity determines the color of the viewable light emerging from the cavity. As the movable wall, typically comprised at least partially of metal, moves towards the stationary front surface of the cavity, the interference of light within the cavity is modulated, and that modulation affects the color of light emerging at the front surface of the modulator. The front surface is typically the surface where the image seen by the viewer appears, in the case where the interferometric modulator is a direct-view device.

FIG. 1 illustrates a networked system in accordance with one embodiment. A server 2, such as a Web server is operatively coupled to a network 3. The server 2 can correspond to a Web server, to a cell-phone server, to a wireless e-mail server, and the like. The network 3 can include wired networks, or wireless networks, such as WiFi networks, cell-phone networks, Bluetooth networks, and the like.

The network 3 can be operatively coupled to a broad variety of devices. Examples of devices that can be coupled to the network 3 include a computer such as a laptop computer 4, a personal digital assistant (PDA) 5, which can include wireless handheld devices such as the BlackBerry, a Palm Pilot, a Pocket PC, and the like, and a cell phone 6, such as a Web-enabled cell phone, Smartphone, and the like. Many other devices can be used, such as desk-top PCs, set-top boxes, digital media players, handheld PCs, Global Positioning System (GPS) navigation devices, automotive displays, or other stationary and mobile displays. For convenience of discussion all of these devices are collectively referred to herein as the client device 7.

Figure 2:
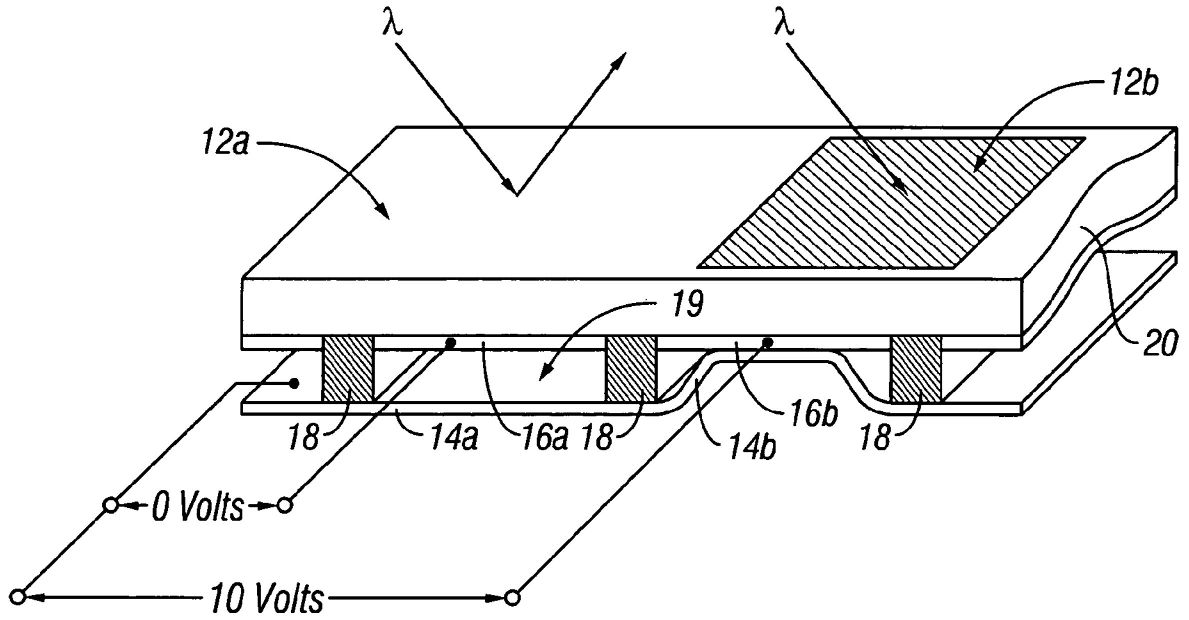
FIG. 2 is an isometric view depicting a portion of one embodiment of an interferometric modulator display array in which a movable reflective layer of a first interferometric modulator is in a released position and a movable reflective layer of a second interferometric modulator is in an actuated position.

One bi-stable display element embodiment comprising an interferometric MEMS display element is illustrated in FIG. 2. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 2 is an isometric view depicting two adjacent pixels in a series of pixels of a visual display array, wherein each pixel comprises a MEMS interferometric modulator. In some embodiments, an interferometric modulator display array comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 2 includes two adjacent interferometric modulators 12*a* and 12*b*. In the interferometric modulator 12*a* on the left, a movable and highly reflective layer 14*a* is illustrated in a released position at a predetermined distance from a fixed partially reflective layer 16*a*. In the interferometric modulator 12*b* on the right, the movable highly reflective layer 14*b* is illustrated in an actuated position adjacent to the fixed partially reflective layer 16*b*.

The partially reflective layers 16*a*, 16*b* are electrically conductive, partially transparent and fixed, and may be fabricated, for example, by depositing one or more layers each of chromium and indium-tin-oxide onto a transparent substrate 20. The layers are patterned into parallel strips, and may form row electrodes in a display device as described further below. The highly reflective layers 14*a*, 14*b* may be formed as a series of parallel strips of a deposited metal layer or layers (orthogonal to the row electrodes, partially reflective layers 16*a*, 16*b*) deposited on top of supports 18 and an intervening sacrificial material deposited between the supports 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the air gap 19 remains between the layers 14*a*, 16*a* and the deformable layer is in a mechanically relaxed state as illustrated by the interferometric modulator 12*a* in FIG. 2. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the interferometric modulator 12*b* on the right in FIG. 2. The behavior is the same regardless of the polarity of the applied potential difference. In this way, row/column actuation that can control the reflective vs. non-reflective interferometric modulator states is analogous in many ways to that used in conventional LCD and other display technologies.

FIGS. 3 through 5 illustrate an exemplary process and system for using an array of interferometric modulators in a display application. However, the process and system can also be applied to other displays, e.g., plasma, EL, OLED, STN LCD, and TFT LCD.

Currently, available flat panel display controllers and drivers have been designed to work almost exclusively with displays that need to be constantly refreshed. Thus, the image displayed on plasma, EL, OLED, STN LCD, and TFT LCD panels, for example, will disappear in a fraction of a second if not refreshed many times within a second. However, because interferometric modulators of the type described above have the ability to hold their state for a longer period of time without refresh, wherein the state of the interferometric modulators may be maintained in either of two states without refreshing, a display that uses interferometric modulators may be referred to as a bi-stable display. In one embodiment, the state of the pixel elements is maintained by applying a bias voltage, sometimes referred to as a latch voltage, to the one or more interferometric modulators that comprise the pixel element.

In general, a display device typically requires one or more controllers and driver circuits for proper control of the display device. Driver circuits, such as those used to drive LCD's, for example, may be bonded directly to, and situated along the edge of the display panel itself. Alternatively, driver circuits may be mounted on flexible circuit elements connecting the display panel (at its edge) to the rest of an electronic system. In either case, the drivers are typically located at the interface of the display panel and the remainder of the electronic system.

Figure 3A:
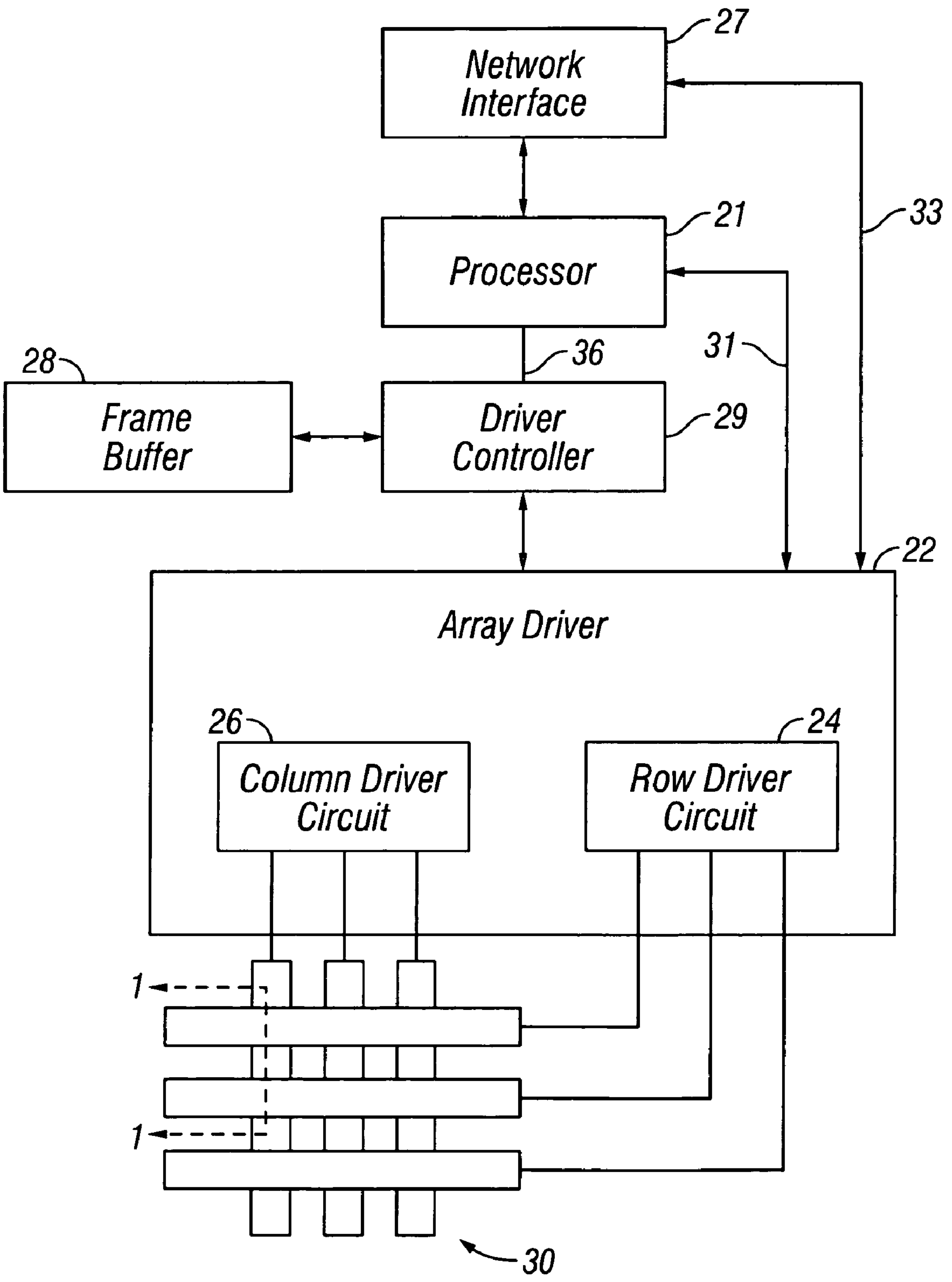
FIG. 3A is a system block diagram illustrating one embodiment of an electronic device incorporating a 3×3 interferometric modulator display array.

FIG. 3A is a system block diagram illustrating some embodiments of an electronic device that can incorporate various aspects. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

FIG. 3A illustrates an embodiment of electronic device that includes a network interface 27 connected to a processor 21 and, according to some embodiments, the network interface can be connected to an array driver 22. The network interface 27 includes the appropriate hardware and software so that the device can interact with another device over a network, for example, the server 2 shown in FIG. 1. The processor 21 is connected to driver controller 29 which is connected to an array driver 22 and to frame buffer 28. In some embodiments, the processor 21 is also connected to the array driver 22. The array driver 22 is connected to and drives the display array 30. The components illustrated in FIG. 3A illustrate a configuration of an interferometric modulator display. However, this configuration can also be used in a LCD with an LCD controller and driver. As illustrated in FIG. 3A, the driver controller 29 is connected to the processor 21 via a parallel bus 36. Although a driver controller 29, such as a LCD controller, is often associated with the system processor 21, as a stand-alone Integrated Circuit (IC), such controllers may be implemented in many ways. They may be embedded in the processor 21 as hardware, embedded in the processor 21 as software, or fully integrated in hardware with the array driver 22. In one embodiment, the driver controller 29 takes the display information generated by the processor 21, reformats that information appropriately for high speed transmission to the display array 30, and sends the formatted information to the array driver 22.

The array driver 22 receives the formatted information from the driver controller 29 and reformats the video data into a parallel set of waveforms that are applied many times per second to the hundreds and sometimes thousands of leads coming from the display's x-y matrix of pixels. The currently available flat panel display controllers and drivers such as those described immediately above have been designed to work almost exclusively with displays that need to be constantly refreshed. Because bi-stable displays (e.g., an array of interferometric modulators) do not require such constant refreshing, features that decrease power requirements may be realized through the use of bi-stable displays. However, if bi-stable displays are operated by the controllers and drivers that are used with current displays the advantages of a bi-stable display may not be optimized. Thus, improved controller and driver systems and methods for use with bi-stable displays are desired. For high speed bi-stable displays, such as the interferometric modulators described above, these improved controllers and drivers preferably implement low-refresh-rate modes, video rate refresh modes, and unique modes to facilitate the unique capabilities of bi-stable modulators. According to the methods and systems described herein, a bi-stable display may be configured to reduce power requirements in various manners.

In one embodiment illustrated by FIG. 3A, the array driver 22 receives video data from the processor 21 via a data link 31 bypassing the driver controller 29. The data link 31 may comprise a serial peripheral interface ("SPI"), $I^2C$ bus, parallel bus, or any other available interface. In one embodiment shown in FIG. 3A, the processor 21 provides instructions to the array driver 22 that allow the array driver 22 to optimize the power requirements of the display array 30 (e.g., an interferometric modulator display). In one embodiment, video data intended for a portion of the display, such as for example defined by the server 2, can be identified by data packet header information and transmitted via the data link 31. In addition, the processor 21 can route primitives, such as graphical primitives, along data link 31 to the array driver 22. These graphical primitives can correspond to instructions such as primitives for drawing shapes and text.

Still referring to FIG. 3A, in one embodiment, video data may be provided from the network interface 27 to the array driver 22 via data link 33. In one embodiment, the network interface 27 analyzes control information that is transmitted from the server 2 and determines whether the incoming video should be routed to either the processor 21 or, alternatively, the array driver 22.

In one embodiment, video data provided by data link 33 is not stored in the frame buffer 28, as is usually the case in many embodiments. It will also be understood that in some embodiments, a second driver controller (not shown) can also be used to render video data for the array driver 22. The data link 33 may comprise a SPI, $I^2C$ bus, or any other available interface. The array driver 22 can also include address decoding, row and column drivers for the display and the like. The network interface 27 can also provide video data directly to the array driver 22 at least partially in response to instructions embedded within the video data provided to the network interface 27. It will be understood by the skilled practitioner that arbiter logic can be used to control access by the network interface 27 and the processor 21 to prevent data collisions at the array driver 22. In one embodiment, a driver executing on the processor 21 controls the timing of data transfer from the network interface 27 to the array driver 22 by permitting the data transfer during time intervals that are typically unused by the processor 21, such as time intervals traditionally used for vertical blanking delays and/or horizontal blanking delays.

Advantageously, this design permits the server 2 to bypass the processor 21 and the driver controller 29, and to directly address a portion of the display array 30. For example, in the illustrated embodiment, this permits the server 2 to directly address a predefined display array area of the display array 30. In one embodiment, the amount of data communicated between the network interface 27 and the array driver 22 is relatively low and is communicated using a serial bus, such as an Inter-Integrated Circuit ($I^2C$) bus or a Serial Peripheral Interface (SPI) bus. It will also be understood, however, that where other types of displays are utilized, that other circuits will typically also be used. The video data provided via data link 33 can advantageously be displayed without a frame buffer 28 and with little or no intervention from the processor 21.

FIG. 3A also illustrates a configuration of a processor 21 coupled to a driver controller 29, such as an interferometric modulator controller. The driver controller 29 is coupled to the array driver 22, which is connected to the display array 30. In this embodiment, the driver controller 29 accounts for the display array 30 optimizations and provides information to the array driver 22 without the need for a separate connection between the array driver 22 and the processor 21. In some embodiments, the processor 21 can be configured to communicate with a driver controller 29, which can include a frame buffer 28 for temporary storage of one or more frames of video data.

As shown in FIG. 3A, in one embodiment the array driver 22 includes a row driver circuit 24 and a column driver circuit 26 that provide signals to a pixel display array 30. The cross section of the array illustrated in FIG. 2 is shown by the lines 1-1 in FIG. 3A. For MEMS interferometric modulators, the row/column actuation protocol may take advantage of a hysteresis property of these devices illustrated in FIG. 4A. It may require, for example, a 10 volt potential difference to cause a movable layer to deform from the released state to the actuated state. However, when the voltage is reduced from that value, the movable layer maintains its state as the voltage drops back below 10 volts. In the exemplary embodiment of FIG. 4A, the movable layer does not release completely until the voltage drops below 2 volts. There is thus a range of voltage, about 3 to 7 V in the example illustrated in FIG. 4A, where there exists a window of applied voltage within which the device is stable in either the released or actuated state. This is referred to herein as the "hysteresis window" or "stability window."

Figures 4A, 4B:
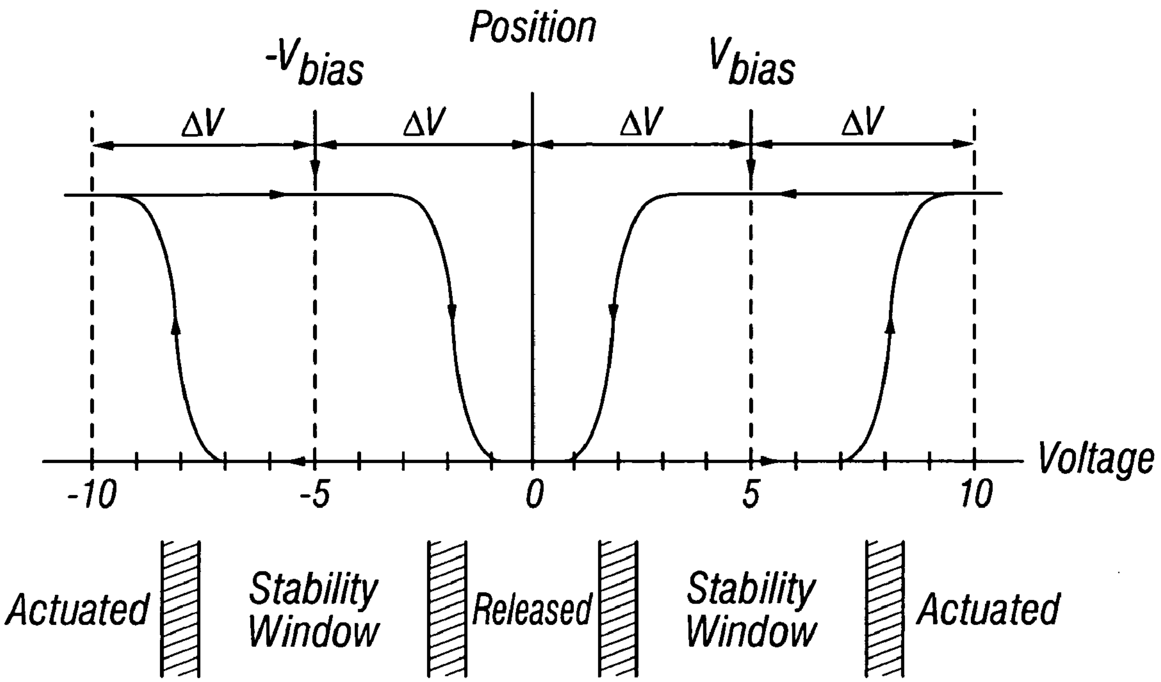
FIG. 4A is a diagram of movable mirror position versus applied voltage for one exemplary embodiment of an interferometric modulator of FIG. 2.
FIG. 4B is an illustration of a set of row and column voltages that may be used to drive an interferometric modulator display array.

For a display array having the hysteresis characteristics of FIG. 4A, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 2 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new video data by continually repeating this process at some desired number of frames per second. A wide variety of protocols for driving row and column electrodes of pixel arrays to produce display array frames are also well known and may be used.

Figure 3B:
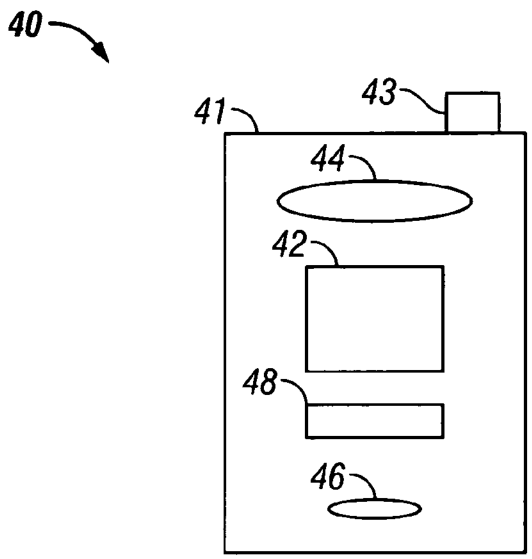
FIG. 3B is an illustration of an embodiment of a client of the server-based wireless network system of FIG. 1.

One embodiment of a client device 7 is illustrated in FIG. 3B. The exemplary client 40 includes a housing 41, a display 42, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 42 of exemplary client 40 may be any of a variety of displays, including a bi-stable display, as described herein with respect to, for example, FIGS. 2, 3A, and 4-6. In other embodiments, the display 42 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 42 includes an interferometric modulator display, as described herein.

Figure 3C:
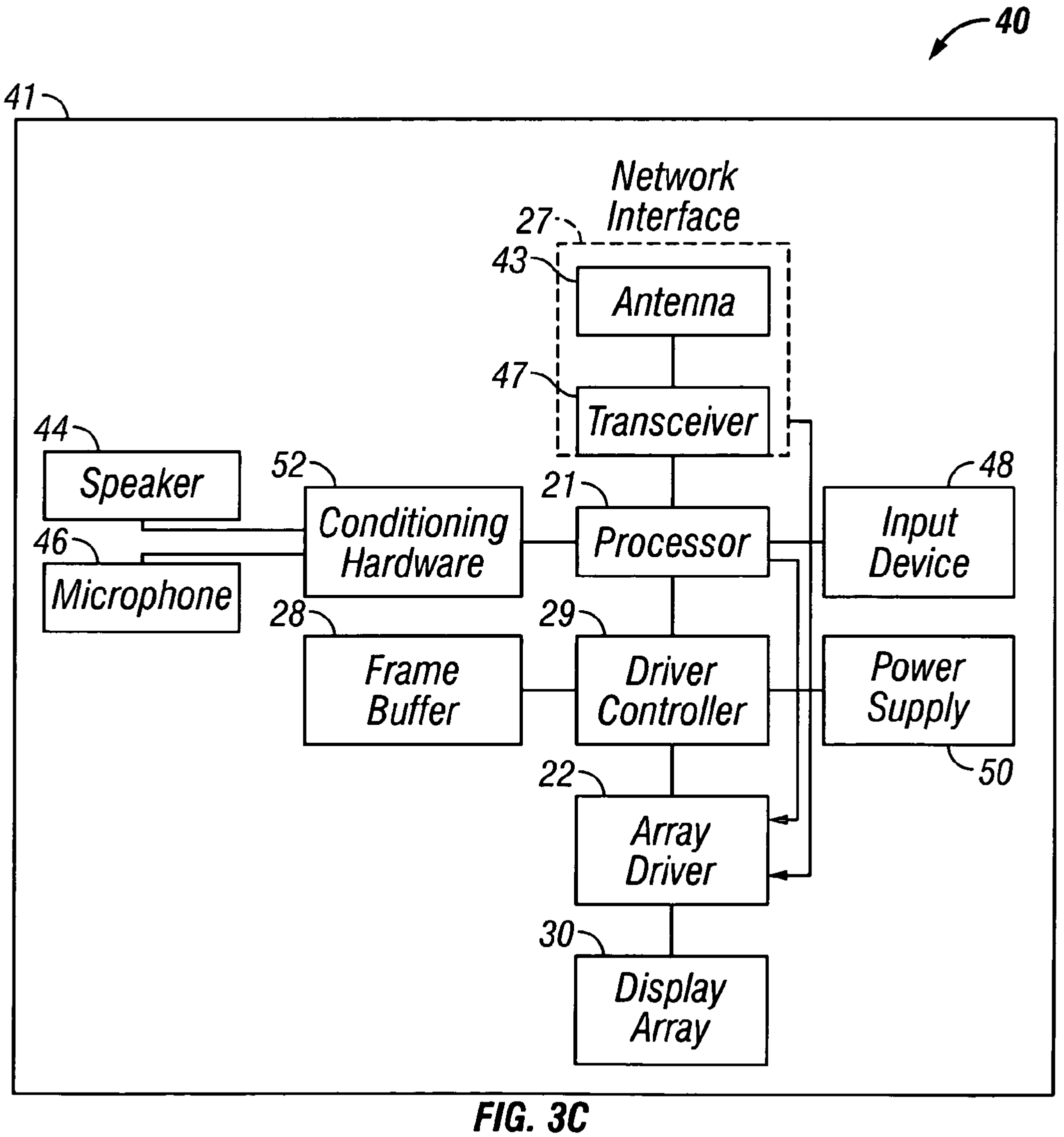
FIG. 3C is an exemplary block diagram configuration of the client in FIG. 3B.

The components of one embodiment of exemplary client 40 are schematically illustrated in FIG. 3C. The illustrated exemplary client 40 includes a housing 41 and can include additional components at least partially enclosed therein. For example, in one embodiment, the client exemplary 40 includes a network interface 27 that includes an antenna 43 which is coupled to a transceiver 47. The transceiver 47 is connected to a processor 21, which is connected to conditioning hardware 52. The conditioning hardware 52 is connected to a speaker 44 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary client 40 design.

The network interface 27 includes the antenna 43, and the transceiver 47 so that the exemplary client 40 can communicate with another device over a network 3, for example, the server 2 shown in FIG. 1. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further processed by the processor 21. The transceiver 47 also processes signals received from the processor 21 so that they may be transmitted from the exemplary client 40 via the antenna 43.

Processor 21 generally controls the overall operation of the exemplary client 40, although operational control may be shared with or given to the server 2 (not shown), as will be described in greater detail below. In one embodiment, the processor 21 includes a microcontroller, CPU, or logic unit to control operation of the exemplary client 40. Conditioning hardware 52 generally includes amplifiers and filters for transmitting signals to the speaker 44, and for receiving signals from the microphone 46. Conditioning hardware 52 may be discrete components within the exemplary client 40, or may be incorporated within the processor 21 or other components.

The input device 48 allows a user to control the operation of the exemplary client 40. In one embodiment, input device 48 includes a keypad, such as a QWERTY keyboard or a telephone keypad, a button, a switch, a touch-sensitive screen, a pressure- or heat-sensitive membrane. In one embodiment, a microphone is an input device for the exemplary client 40. When a microphone is used to input data to the device, voice commands may be provided by a user for controlling operations of the exemplary client 40.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., a interferometric modulator display). In yet another embodiment, display array 30 is a typical display array or a bi-stable display array (e.g., a display including an array of interferometric modulators).

Power supply 50 is any of a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In one embodiment, the array driver 22 contains a register that may be set to a predefined value to indicate that the input video stream is in an interlaced format and should be displayed on the bi-stable display in an interlaced format, without converting the video stream to a progressive scanned format. In this way the bi-stable display does not require interlace-to-progressive scan conversion of interlace video data.

In some implementations control programmability resides, as described above, in a display controller which can be located in several places in the electronic display system. In some cases control programmability resides in the array driver 22 located at the interface between the electronic display system and the display component itself. Those of skill in the art will recognize that the above-described optimization may be implemented in any number of hardware and/or software components and in various configurations.

In one embodiment, circuitry is embedded in the array driver 22 to take advantage of the fact that the output signal set of most graphics controllers includes a signal to delineate the horizontal active area of the display array 30 being addressed. This horizontal active area can be changed via register settings in the driver controller 29. These register settings can be changed by the processor 21. This signal is usually designated as display enable (DE). Most all display video interfaces in addition utilize a line pulse (LP) or a horizontal synchronization (HSYNC) signal, which indicates the end of a line of data. A circuit which counts LPs can determine the vertical position of the current row. When refresh signals are conditioned upon the DE from the processor 21 (signaling for a horizontal region), and upon the LP counter circuit (signaling for a vertical region) an area update function can be implemented.

In one embodiment, a driver controller 29 is integrated with the array driver 22. Such an embodiment is common in highly integrated systems such as cellular phones, watches, and other small area displays. Specialized circuitry within such an integrated array driver 22 first determines which pixels and hence rows require refresh, and only selects those rows that have pixels that have changed to update. With such circuitry, particular rows can be addressed in non-sequential order, on a changing basis depending on image content. This embodiment has the advantage that since only the changed video data needs to be sent through the interface, data rates can be reduced between the processor 21 and the display array 30. Lowering the effective data rate required between processor 21 and array driver 22 improves power consumption, noise immunity and electromagnetic interference issues for the system.

FIGS. 4 and 5 illustrate one possible actuation protocol for creating a display frame on the 3×3 array of FIG. 3. FIG. 4B illustrates a possible set of column and row voltage levels that may be used for pixels exhibiting the hysteresis curves of FIG. 4A. In the FIG. 4A/4B embodiment, actuating a pixel may involve setting the appropriate column to $-V_{bias}$, and the appropriate row to $+\Delta V$, which may correspond to −5 volts and +5 volts respectively. Releasing the pixel may be accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. Similarly, actuating a pixel may involve setting the appropriate column to $+V_{bias}$, and the appropriate row to $-\Delta V$, which may correspond to 5 volts and −5 volts respectively. Releasing the pixel may be accomplished by setting the appropriate column to $-V_{bias}$, and the appropriate row to the same $-\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$.

Figure 5A:
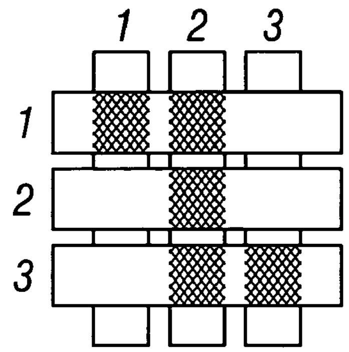
FIGS. 5A and 5B illustrate one exemplary timing diagram for row and column signals that may be used to write a frame of data to the 3×3 interferometric modulator display array of FIG. 3A.
Figure 5B:
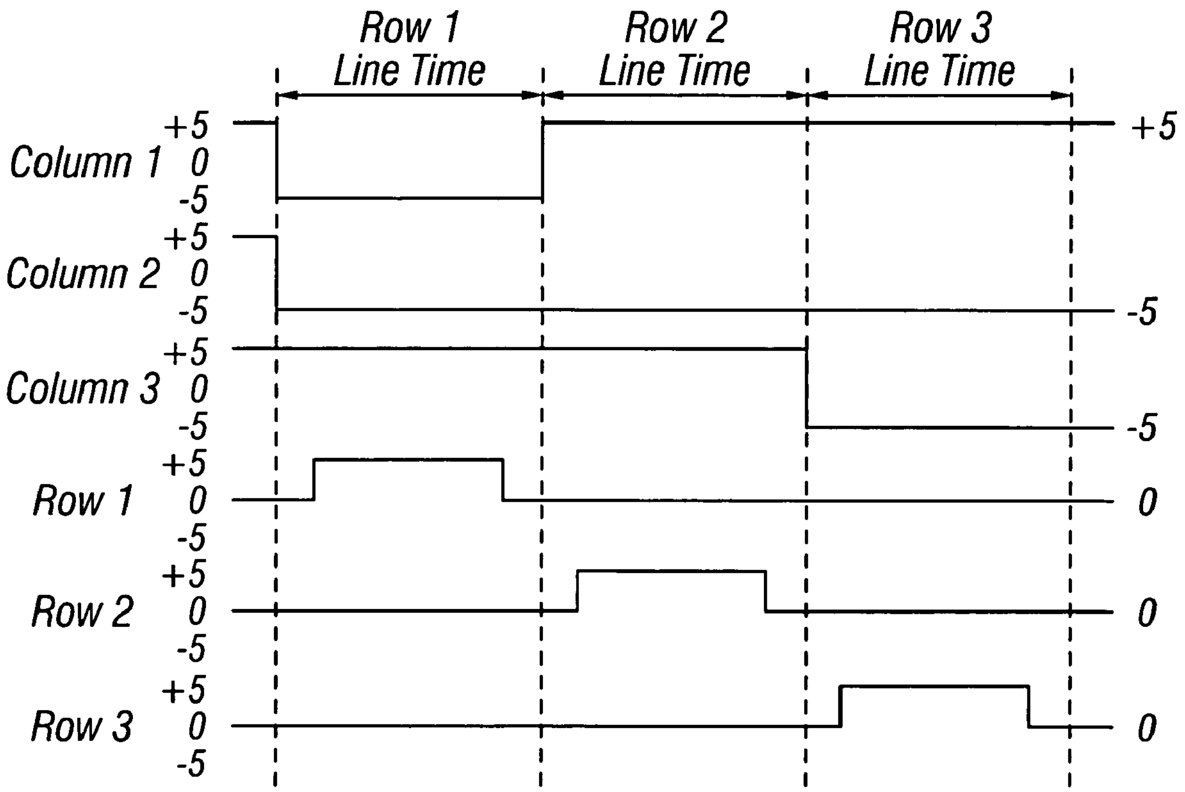

FIG. 5B is a timing diagram showing a series of row and column signals applied to the 3×3 array of FIG. 3A which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and releases the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used.

Figure 6A:
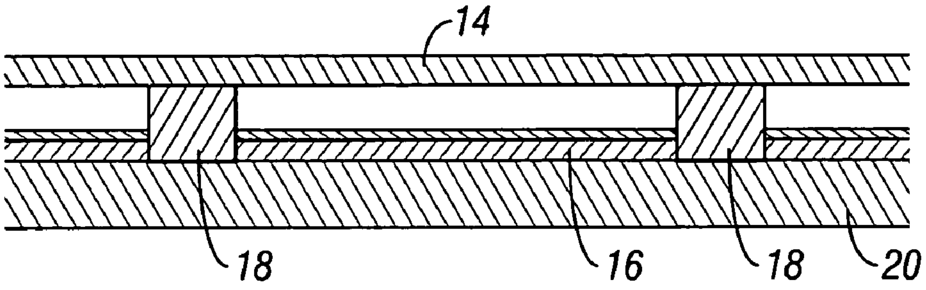
FIG. 6A is a cross section of the interferometric modulator of FIG. 2.
Figure 6B:
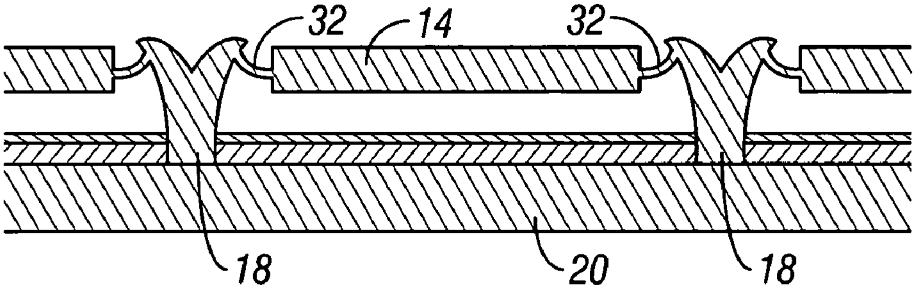
FIG. 6B is a cross section of an alternative embodiment of an interferometric modulator.
Figure 6C:
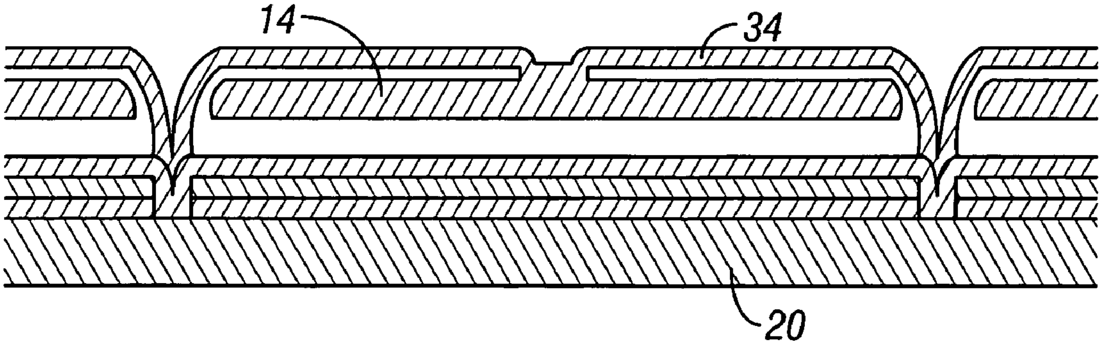
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG. 6A is a cross section of the embodiment of FIG. 2, where a strip of reflective material 14 is deposited on orthogonal supports 18. In FIG. 6B, the reflective material 14 is attached to supports 18 at the corners only, on tethers 32. In FIG. 6C, the reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of well known techniques may be used to produce the above described structures involving a series of material deposition, patterning, and etching steps.

Figure 7:
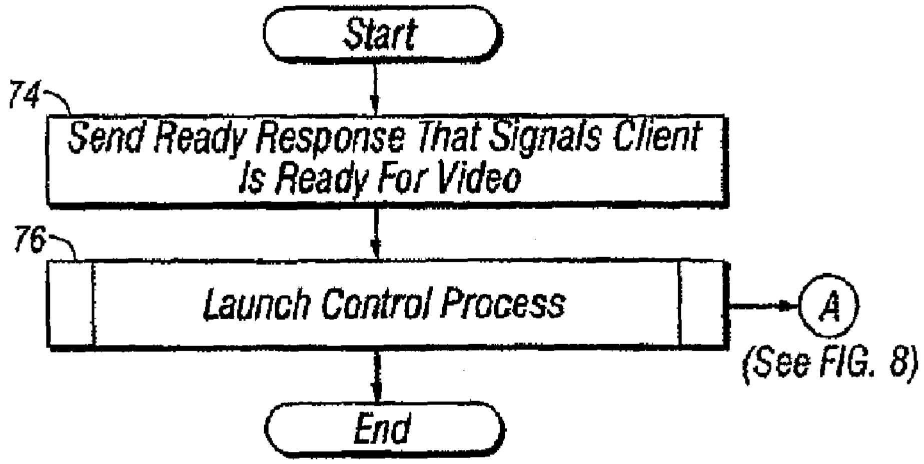
FIG. 7 is a high level flowchart of a client control process.

An embodiment of process flow is illustrated in FIG. 7, which shows a high-level flowchart of a client device 7 control process. This flowchart describes the process used by a client device 7, such as a laptop computer 4, a PDA 5, or a cell phone 6, connected to a network 3, to graphically display video data, received from a server 2 via the network 3. Depending on the embodiment, states of FIG. 7 can be removed, added, or rearranged.

Again referring to FIG. 7, starting at state 74 the client device 7 sends a signal to the server 2 via the network 3 that indicates the client device 7 is ready for video. In one embodiment a user may start the process of FIG. 7 by turning on an electronic device such as a cell phone. Continuing to state 76 the client device 7 launches its control process. An example of launching a control process is discussed further with reference to FIG. 8.

Figure 8:
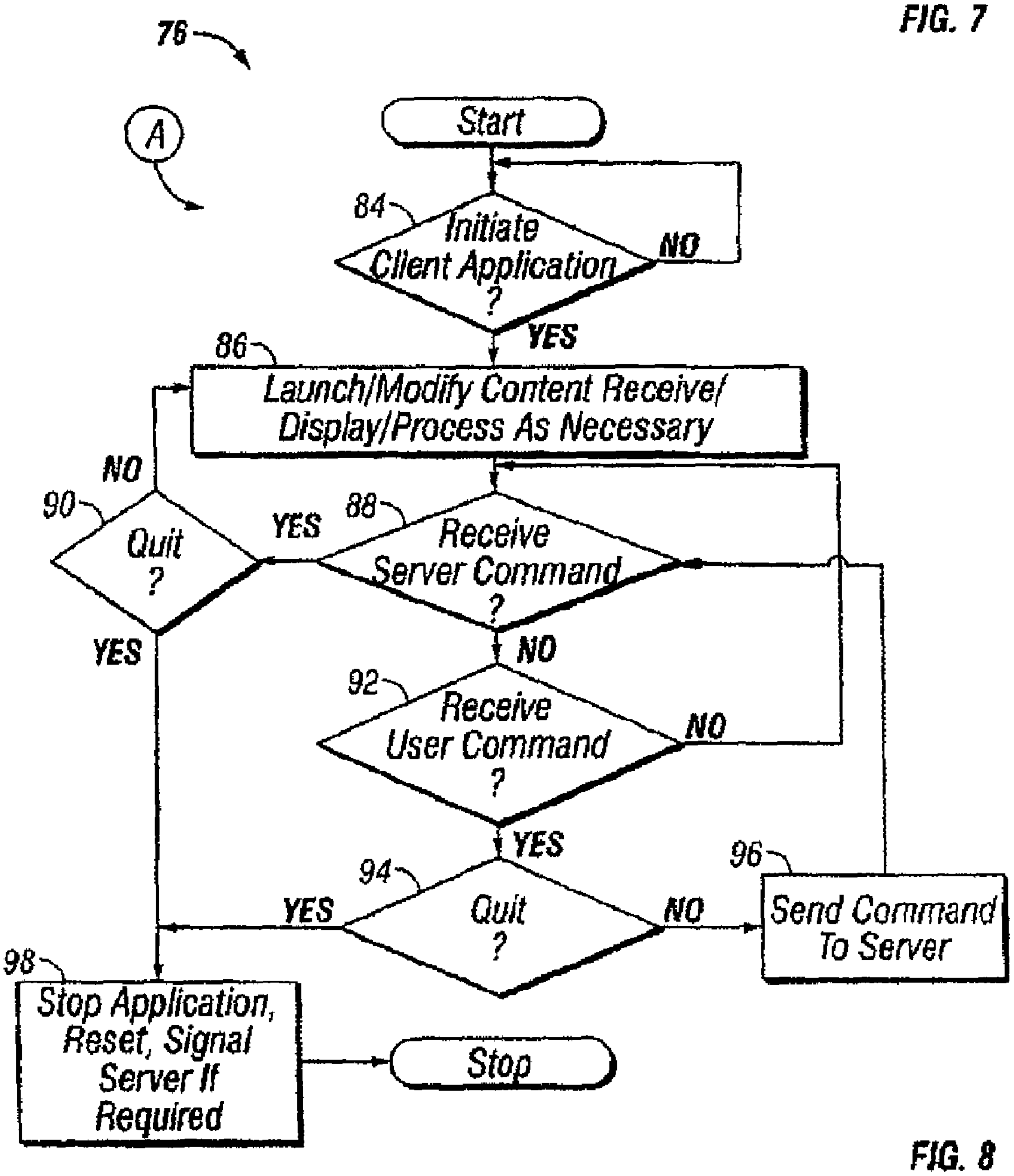
FIG. 8 is a flowchart of a client control process for launching and running a receive/display process.

An embodiment of process flow is illustrated in FIG. 8, which shows a flowchart of a client device 7 control process for launching and running a control process. This flowchart illustrates in further detail state 76 discussed with reference to FIG. 7. Depending on the embodiment, states of FIG. 8 can be removed, added, or rearranged.

Starting at decision state 84, the client device 7 makes a determination whether an action at the client device 7 requires an application at the client device 7 to be started, or whether the server 2 has transmitted an application to the client device 7 for execution, or whether the server 2 has transmitted to the client device 7 a request to execute an application resident at the client device 7. If there is no need to launch an application the client device 7 remains at decision state 84. After starting an application, continuing to state 86, the client device 7 launches a process by which the client device 7 receives and displays video data. The video data may stream from the server 2, or may be downloaded to the client device 7 memory for later access. The video data can be video, or a still image, or textual or pictorial information. The video data can also have various compression encodings, and be interlaced or progressively scanned, and have various and varying refresh rates. The display array 30 may be segmented into regions of arbitrary shape and size, each region receiving video data with characteristics, such as refresh rate or compression encoding, specific only to that region. The regions may change video data characteristics and shape and size. The regions may be opened and closed and re-opened. Along with video data, the client device 7 can also receive control data. The control data can comprise commands from the server 2 to the client device 7 regarding, for example, video data characteristics such as compression encoding, refresh rate, and interlaced or progressively scanned video data. The control data may contain control instructions for segmentation of display array 30, as well as differing instructions for different regions of display array 30.

In one exemplary embodiment, the server 2 sends control and video data to a PDA via a wireless network 3 to produce a continuously updating clock in the upper right corner of the display array 30, a picture slideshow in the upper left corner of the display array 30, a periodically updating score of a ball game along a lower region of the display array 30, and a cloud shaped bubble reminder to buy bread continuously scrolling across the entire display array 30. The video data for the photo slideshow are downloaded and reside in the PDA memory, and they are in an interlaced format. The clock and the ball game video data stream text from the server 2. The reminder is text with a graphic and is in a progressively scanned format. It is appreciated that here presented is only an exemplary embodiment. Other embodiments are possible and are encompassed by state 86 and fall within the scope of this discussion.

Continuing to decision state 88, the client device 7 looks for a command from the server 2, such as a command to relocate a region of the display array 30, a command to change the refresh rate for a region of the display array 30, or a command to quit. Upon receiving a command from the server 2, the client device 7 proceeds to decision state 90, and determines whether or not the command received while at decision state 88 is a command to quit. If, while at decision state 90, the command received while at decision state 88 is determined to be a command to quit, the client device 7 continues to state 98, and stops execution of the application and resets. The client device 7 may also communicate status or other information to the server 2, and/or may receive such similar communications from the server 2. If, while at decision state 90, the command received from the server 2 while at decision state 88 is determined to not be a command to quit, the client device 7 proceeds back to state 86. If, while at decision state 88, a command from the server 2 is not received, the client device 7 advances to decision state 92, at which the client device 7 looks for a command from the user, such as a command to stop updating a region of the display array 30, or a command to quit. If, while at decision state 92, the client device 7 receives no command from the user, the client device 7 returns to decision state 88. If, while at decision state 92, a command from the user is received, the client device 7 proceeds to decision state 94, at which the client device 7 determines whether or not the command received in decision state 92 is a command to quit. If, while at decision state 94, the command from the user received while at decision state 92 is not a command to quit, the client device 7 proceeds from decision state 94 to state 96. At state 96 the client device 7 sends to the server 2 the user command received while at state 92, such as a command to stop updating a region of the display array 30, after which it returns to decision state 88. If, while at decision state 94, the command from the user received while at decision state 92 is determined to be a command to quit, the client device 7 continues to state 98, and stops execution of the application. The client device 7 may also communicate status or other information to the server 2, and/or may receive such similar communications from the server 2.

Figure 9:
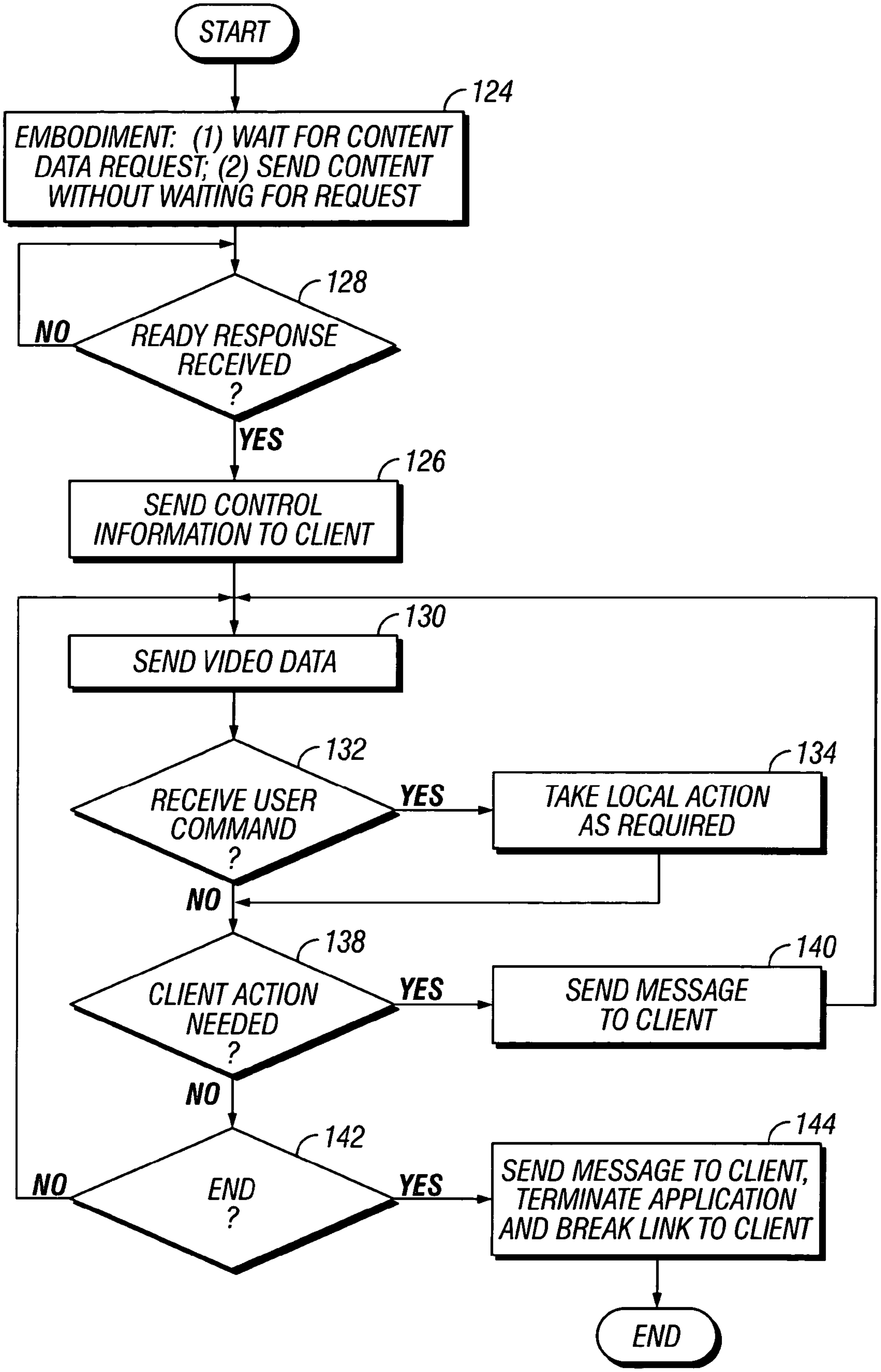
FIG. 9 is a flowchart of a server control process for sending video data to a client.

FIG. 9 illustrates a control process by which the server 2 sends video data to the client device 7. The server 2 sends control information and video data to the client device 7 for display. Depending on the embodiment, states of FIG. 9 can be removed, added, or rearranged.

Starting at state 124 the server 2, in embodiment (1), waits for a data request via the network 3 from the client device 7, and alternatively, in embodiment (2) the server 2 sends video data without waiting for a data request from the client device 7. The two embodiments encompass scenarios in which either the server 2 or the client device 7 may initiate requests for video data to be sent from the server 2 to the client device 7.

The server 2 continues to decision state 128, at which a determination is made as to whether or not a response from the client device 7 has been received indicating that the client device 7 is ready (ready indication signal). If, while at state 128, a ready indication signal is not received, the server 2 remains at decision state 128 until a ready indication signal is received.

Once a ready indication signal is received, the server 2 proceeds to state 126, at which the server 2 sends control data to the client device 7. The control data may stream from the server 2, or may be downloaded to the client device 7 memory for later access. The control data may segment the display array 30 into regions of arbitrary shape and size, and may define video data characteristics, such as refresh rate or interlaced format for a particular region or all regions. The control data may cause the regions to be opened or closed or re-opened.

Continuing to state 130, the server 2 sends video data. The video data may stream from the server 2, or may be downloaded to the client device 7 memory for later access. The video data can include motion images, or still images, textual or pictorial images. The video data can also have various compression encodings, and be interlaced or progressively scanned, and have various and varying refresh rates. Each region may receive video data with characteristics, such as refresh rate or compression encoding, specific only to that region.

The server 2 proceeds to decision state 132, at which the server 2 looks for a command from the user, such as a command to stop updating a region of the display array 30, to increase the refresh rate, or a command to quit. If, while at decision state 132, the server 2 receives a command from the user, the server 2 advances to state 134. At state 134 the server 2 executes the command received from the user at state 132, and then proceeds to decision state 138. If, while at decision state 132, the server 2 receives no command from the user, the server 2 advances to decision state 138.

At state 138 the server 2 determines whether or not action by the client device 7 is needed, such as an action to receive and store video data to be displayed later, to increase the data transfer rate, or to expect the next set of video data to be in interlaced format. If, while at decision state 138, the server 2 determines that an action by the client is needed, the server 2 advances to state 140, at which the server 2 sends a command to the client device 7 to take the action, after which the server 2 then proceeds to state 130. If, while at decision state 138, the server 2 determines that an action by the client is not needed, the server 2 advances to decision state 142.

Continuing at decision state 142, the server 2 determines whether or not to end data transfer. If, while at decision state 142, the server 2 determines to not end data transfer, server 2 returns to state 130. If, while at decision state 142, the server 2 determines to end data transfer, server 2 proceeds to state 144, at which the server 2 ends data transfer, and sends a quit message to the client. The server 2 may also communicate status or other information to the client device 7, and/or may receive such similar communications from the client device 7.

Figure 10:
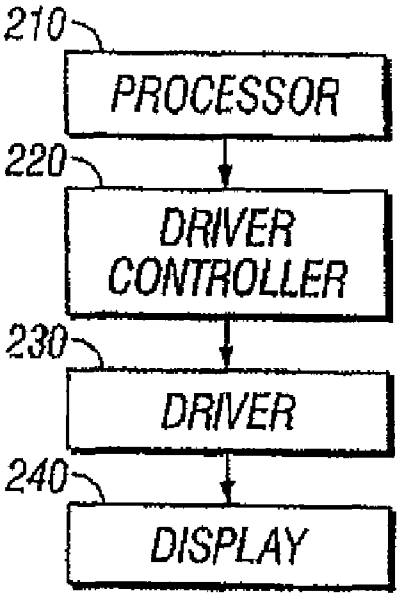
FIG. 10 is a block diagram illustrating a typical configuration of a processor with a driver controller, a driver, and a display.

FIG. 10 is a block diagram illustrating a typical configuration of a driving circuit and corresponding display. For example, the components shown in FIG. 10 illustrate a typical configuration of a LCD driving circuit for driving a LCD 240 with a LCD driver controller 220 and a LCD driver 230. In FIG. 10, the LCD driver controller 220 is typically allied with the processor 21 of the associated electronic system, for example, a processor 21 of a personal computer, personal digital assistant, or digital phone. Although a driver controller 220 is often associated with the processor 21 as a stand-alone integrated circuit (IC), such driver controllers 220 may be implemented in many ways. For example, the driver controller 220 can be embedded in the processor 21 as hardware, embedded in the processor 21 as software, or fully integrated in hardware with the array driver 230. In one embodiment, the driver controller 220 takes the display information generated by the processor 21, reformats that information appropriately for high speed transmission to the display array 240, and sends the formatted information to the driver 230 to be used for displaying video data on the display array 240.

Figure 11:
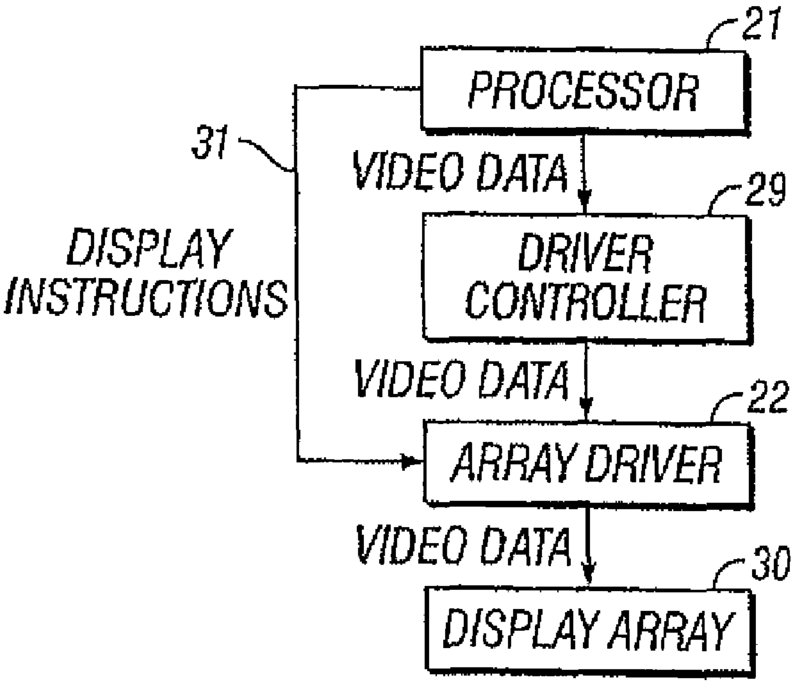
FIG. 11 is a block diagram illustrating one embodiment of a display and driver circuit that includes a processor, a driver controller, an array driver, and a display array of bi-stable elements.

FIG. 11 is a simplified block diagram illustrating one embodiment of the electronic device shown in FIG. 3A. In this embodiment, the device includes the processor 21 connected to the driver controller 29. The bi-stable array driver 22 is connected to the processor 21 via the data link 31, and the driver controller 29. The array driver 22 provides signals to the bi-stable display array 30 for displaying video data. In this embodiment, the display array 30 is an interferometric modulator display. The array driver 22 can be advantageously configured to utilize one or more display processes that reduce the power requirements of the display array 30. Several of these display processes are discussed in further detail below.

As illustrated in FIG. 11, the array driver 22 can receive video data from the driver controller 29 that is used to control a typical display, for example, a LCD. To take advantage of display processes that can be used to refresh and/or update a bi-stable display element, the array driver 22 is also coupled to the processor 21 via a data link 31. The processor 21 is configured to implement the advantageous display processes for the bi-stable display element. The data link 31 can be any type of data link suitable to communicate display signals from the processor 21 to the array driver 22. In one embodiment, the data link 31 can include a serial peripheral interface ("SPI") or another suitable interface. In the embodiment of FIG. 11, the processor 21 provides instructions to the array driver 22 to display data in accordance with display processes that reduce the power requirements of the display array 30. The embodiment shown in FIG. 11 allows features of the display array 30 to be used when the driving circuit includes a widely available driver controller 29 (e.g., a LCD controller) that is not specifically configured for driving a bi-stable display array, e.g., a non-bi-stable driver controller. By using a common and widely available driver controller, the cost and complexity of implementing features for the display array can be reduced.

Figure 12:
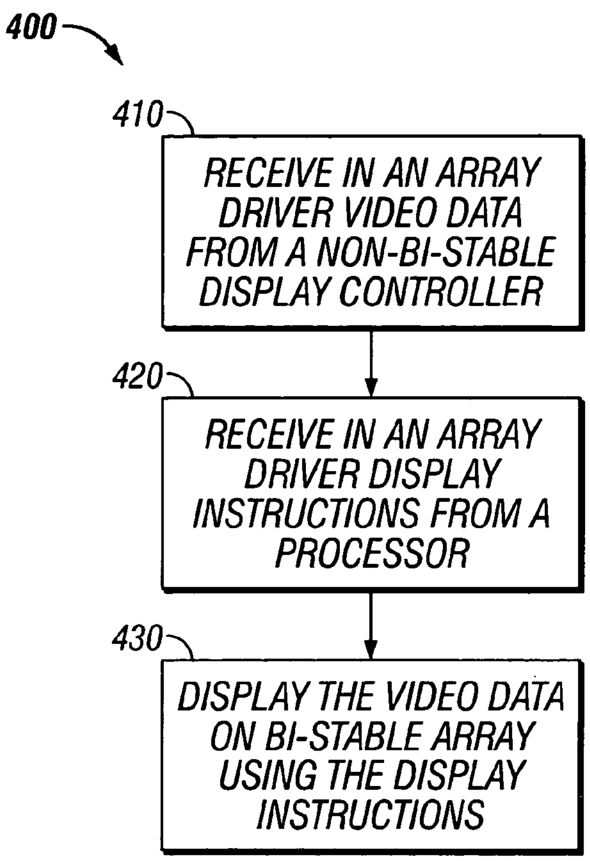
FIG. 12 is a flow diagram illustrating a process for displaying data on an array of bi-stable elements.

FIG. 12 is a flow diagram showing one embodiment of a process 400 for displaying data on an array of bi-stable display elements in accordance with the embodiment of a driving circuit illustrated in FIG. 11. In particular, the process 400 in FIG. 12 illustrates driving a display array 30 using the non-bi-stable driver controller 29 of FIG. 11. In state 410 of the process 400, the array driver 22 receives video data from a non-bi-stable driver controller 29. Because the driver controller 29 is a non-bi-stable driver controller, the driver controller 29 does not provide display signals to the array driver 22 to display data on the display array 30 in accordance with a particular display scheme that advantageously utilizes characteristics of a bi-stable display element. Accordingly, instead of receiving display signals from driver controller 29, in state 420, the array driver 22 receives display signals from the processor 21, using the data link 33 shown in FIG. 11. In state 430, having received both the video data and appropriate display signals, in state 430 the video data is displayed on the display array 30 using the display signals received from the processor 21. In an alternative embodiment shown in FIG. 3A, the array driver 22 receives display signals from the server 2 (FIG. 1) through the network interface 27 (FIG. 3A). In such an embodiment, the server 2 is configured to determine a display process for displaying the video data on the array 30 and to send corresponding display signals to the array driver 22 so that the video data is displayed on the array 30 accordingly.

Figure 13:
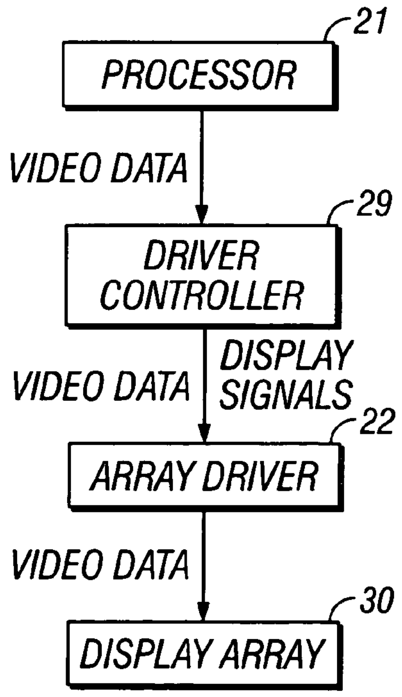
FIG. 13 is a block diagram illustrating one embodiment of a display and driver circuit that includes a processor, a driver controller, an array driver, and a display array.
Figure 14:
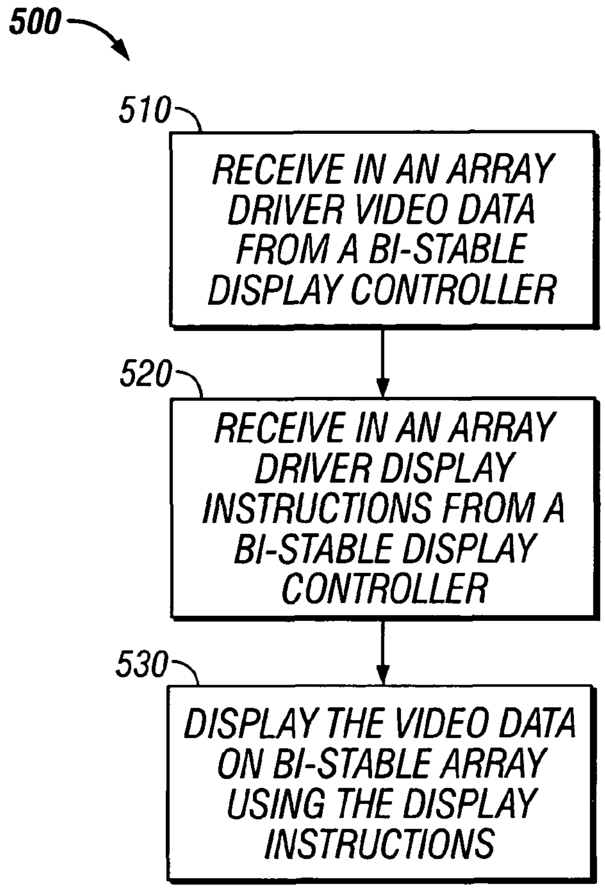
FIG. 14 is a flow diagram illustrating another process for displaying data on an array of interferometric modulators.

FIG. 13 is a simplified block diagram illustrating another embodiment of the electronic device shown in FIG. 3A. In FIG. 13, the processor 21 is connected to the driver controller 29, which in this embodiment is a bi-stable driver controller. The driver controller 29 is connected to the array driver 22, which is connected to the display array 30. In this embodiment, the driver controller 29 is configured with display update and refresh processes and provides display signals to the array driver 22 that can reduce the power needed for displaying data on the display array 30 without the need for a separate connection between the array driver 22 and the processor 21. This embodiment is further illustrated in FIG. 14, which shows a process 500 for displaying data on an array of bi-stable display elements in accordance with the embodiment shown in FIG. 13. In state 510 of the process 500, an array driver 22 receives video data from a bi-stable driver controller 29. In state 520, the array driver 22 also receives display signals from the bi-stable driver controller 29. In state 530, the video data is displayed on the display array 30 using the display signals received from the driver controller 29.

Bi-stable displays, as do most flat panel displays, consume most of their power during frame update. Accordingly, it is desirable to be able to control how often a bi-stable display is updated in order to conserve power. For example, if there is very little change between adjacent frames of a video stream, the display may be refreshed less frequently with little or no loss in image quality. As an example, image quality of typical PC desktop applications, displayed on an interferometric modulator display, would not suffer from a decreased refresh rate, since the interferometric modulator display is not susceptible to the flicker that would result from decreasing the refresh rate of most other displays. Thus, during operation of certain applications, the PC display system may reduce the refresh rate of bi-stable display elements, such as interferometric modulators, with minimal effect on the output of the display.

Similarly, if a display device has a refresh rate that is higher than the frame rate of the display feed, the display device may reduce power requirements by reducing the refresh rate. While reduction of the refresh rate is not possible on a typical display, such as a LCD, a bi-stable display (for example, an interferometric modulator display) can maintain the state of the pixel element for a longer period of time and, thus, may reduce the refresh rate when necessary. As an example, if a video stream being displayed on a PDA has a frame rate of 15 Hz and the bi-stable PDA display is capable of refreshing at a rate of 60 times per second (having a refresh rate of 1/60 sec=16.67 ms), then a typical bi-stable display may update the display with each frame of data up to four times. For example, a 15 Hz frame rate updates every 66.67 ms. For a bi-stable display having a refresh rate of 16.67 ms, each frame may be displayed on the display device up to 66.67 ms/16.67 ms=4 times. However, each refresh of the display device requires some power and, thus, power may be reduced by reducing the number of updates to the display device. With respect to the above example, when a bi-stable display device is used, up to 3 refreshes per video frame may be removed without affecting the output display. More particularly, because both the on and off states of pixels in a bi-stable display may be maintained without refreshing the pixels, a frame of data from the video stream need only be updated on the display device once, and then maintained until a new video frame is ready for display. Accordingly, a bi-stable display may reduce power requirements by displaying, without refresh until a new video frame is available.

In one embodiment, frames of a video stream are skipped, based on a programmable "frame skip count." Referring to FIGS. 11 and 13, in some embodiments, the display array driver 22, may be programmed to skip a number of refreshes that are available with the bi-stable display. In one embodiment, a register in the array driver 22 stores a value, such as 0, 1, 2, 3, 4, 5 etc., that represents a frame skip count. The array driver 22 may then access this register in order to determine the frequency of refreshing the display array 30. For example, the values 0, 1, 2, 3, 4, and 5 may indicate that the driver updates every frame, every other frame, every third frame, every fourth frame, every fifth frame, and every sixth frame, respectively. In one embodiment, this register is programmable through a communication bus (of either parallel or serial type) or a direct serial link, such as via a SPI. In another embodiment, the register is programmable from a direct connection with a driver controller, for example, the driver controller 29 (FIG. 12). Also, to eliminate the need for any serial or parallel communication channel beyond the high-speed data transmission link described above, the register programming information can be embedded within the data transmission stream at the controller and extracted from that stream at the driver.

In one embodiment, a user of the display array 30 determines the frame skip count that is to be stored in the array driver 22. The user may then periodically update the frame skip count, based upon the particular use of the bi-stable display, for example. In another embodiment, the processor 21 or the driver controller 29 is configured to monitor the use of the display array 30 and automatically modify the frame skip count. For example, the driver controller 29 may determine that sequential frames in a video feed have little variance and, thus, set the frame skip count at a value higher than 0. In the embodiment of FIG. 11, the processor 21 may be configured to communicate the frame skip count via the data link 31 or through data embedded in the high speed data stream. In one embodiment, the processor 21 or the driver controller 29 may set the frame skip count based partly on a user selected video quality and the then-current video characteristics.

One of the controller's central functions it to format and send to the driver data representing the image to be shown on the display. This image data typically resides in a particular portion of the memory of the system in which the controller resides. Since the display array 30 does not require constant updates to maintain an image, in one embodiment the driver controller 29 or the processor 21 monitors changes in the relevant image-data portion of memory and sends to the bi-stable display only that portion of the image data associated with portions of the image that have changed. In this way, changes to the display array 30 may be reduced by only updating those portions of the display that have changed. Depending on the capabilities of the particular bi-stable display, these changes may be sent on a pixel-by-pixel basis, a rectangular area basis where both vertical and horizontal limits can be defined, or a rectangular area basis where only a vertical dimension is defined.

Similar to implementation of the frame-skip optimization discussed above, the area update optimization may be implemented via one or more registers in the array driver 22, where the registers are programmable either automatically by the driver controller 29 or the processor 21. In one embodiment, the array driver 22 includes registers that define a portion of the total display area. In operation, the array driver 22 can pass the display data for the portion defined by the registers to the display array 30. Thus, in addition to reducing the number of pixel changes required, thereby reducing the power requirements of the display array 30, further power reduction is achieved because only a reduced portion of the data bandwidth between the driver controller 29 and the display array 30 will be used. In one embodiment, for example, a bi-stable display on a cell phone may display a current time in a HH:MM:SS format in a corner of the display. The driver controller 29, or the processor 21, may automatically, and/or based upon input from the user, determine that only a small portion of the bi-stable display is being updated and adjust the values in the registers to define this area. Accordingly, only the portion of the display that is changing is refreshed. In this example, a frame skip register may also be set to work in conjunction with the area update. More particularly, the skip-rate register may be set so that the area defined in the area update registers is only updated once every second, for example. In this way, power savings may be reduced even further through a combination of optimizations.

Most images displayed as computer graphics are scanned from top to bottom in each frame time in a completely "progressive" manner, where progressive means that each row is scanned in turn from the top of the display to the bottom of the display. However, most entertainment content, such as the content displayed on TV receivers, VCRs, and other consumer electronic equipment, is received and displayed in an "interlaced" fashion. The term "interlaced," as used herein, means that the 1st, 3rd, 5th, and all remaining odd numbered rows in the image are scanned in one video frame time, and the 2nd, 4th, 6th, and all remaining even numbered rows are scanned in the next video frame time. This alternation of what are commonly referred to as "fields" reduces by 50% the rate at which image data must move through the video system.

Because most modem computer graphic systems as well as essentially all flat panel consumer electronic display systems use only progressive scan, interlaced material is typically converted to a progressive scan format in order to be displayed on progressive scan displays. This is typically done in real-time by a powerful computing IC (or set of ICs) that interpolate odd-line data in each of the even-line frames and even-line data in each of the odd-line frames. However, because the rows of a bi-stable display can be scanned in any order, the display array 30 may directly receive and write to the appropriate lines in the bi-stable display device. Thus, interlaced video content may be displayed on the bi-stable display by selecting every other even row during the even-line frames and every other odd row during the odd-line frame. Accordingly, interlaced video may be displayed on the bi-stable display without requiring interpolation of the interlaced video and without the loss of image quality that would be incurred in other display types.

In one embodiment, the array driver 22 contains a register that may be set to a predefined value to indicate that the input video stream is in an interlaced format and should be displayed on the bi-stable display in an interlaced format, without converting the video stream to a progressive scanned format. In this way the display array 30 does not require interlaced-to-progressive scan conversion of interlaced data. In one embodiment, a bi-stable controller, for example the driver controller 29, working with bi-stable drivers, such as array driver 22, that do not have this feature built in would recognize this capability of the display array 30 and generate the proper row address pulses and sequence the image data properly to achieve the same result.

The three optimizations described above can be advantageously operated in parallel with one another, such that interlaced video data may be displayed on a portion of the display at reduced frame rates.

In some implementations control programmability resides, as described above in, a display controller which can be located in several places in the electronic display system. In some cases control programmability resides in an array driver located at the interface between the electronic display system and the display component itself. Those of skill in the art will recognize that the above-described optimization may be implemented in any number of hardware and/or software components and in various configurations.

Figure 15:
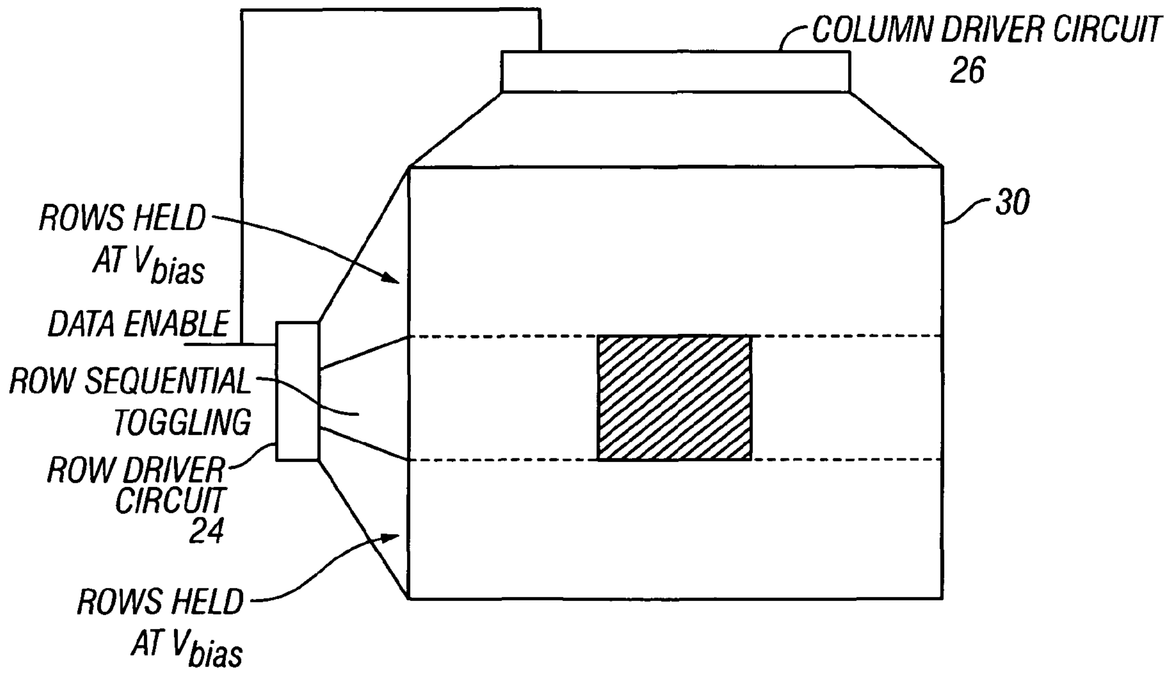
FIG. 15 is a schematic diagram illustrating an array driver that is configured to use an area update optimization process.

FIG. 15 is a schematic diagram illustrating an array driver, such as the array driver 22 shown in FIG. 3A, that is configured to use an area update optimization process. As an exemplary embodiment, the circuitry referred to here is shown in FIG. 3A. The array driver 22 includes a row driver circuit 24 and a column driver circuit 26. In the embodiment shown in FIG. 15, circuitry is embedded in an array driver 22 to use a signal that is included in the output signal set of a driver controller 29 to delineate the active area of the display array 30 being addressed. The signal to delineate the active area is typically designated as a display enable (DE). The active area of the display array 30 can be determined via register settings in the driver controller 29 and can be changed by the processor 21 (FIG. 3A). The circuitry embedded in the array driver 22 can monitor the DE signal and use it to selectively address portions of the display. Most all display video interfaces in addition utilize a line pulse (LP) or a horizontal synchronization (HSYNC) signal, which indicates the end of a line of data. A circuit which counts LPs can determine the vertical position of the current row. When refresh signals are conditioned upon the DE from the processor 21 (signaling for a horizontal region), and upon the LP counter circuit (signaling for a vertical region) an area update function can be implemented. The signal the row driver circuit 24 asserts, for example, $-\Delta V$, 0, or $+\Delta V$ voltage levels, is determined by the value of a Line Pulse counter and when DE is enabled. For a particular row, if a Line Pulse is received and the DE signal is not active, the row voltage level does not change but a counter is incremented. When the DE signal is active and the Line Pulse is received, the row driver circuit 24 asserts the desired voltage level on the row. If the Line Pulse counter indicates that the row is in an area of the display to be updated, it asserts the desired signal on the row. Otherwise, no signal is asserted.

Figure 16:
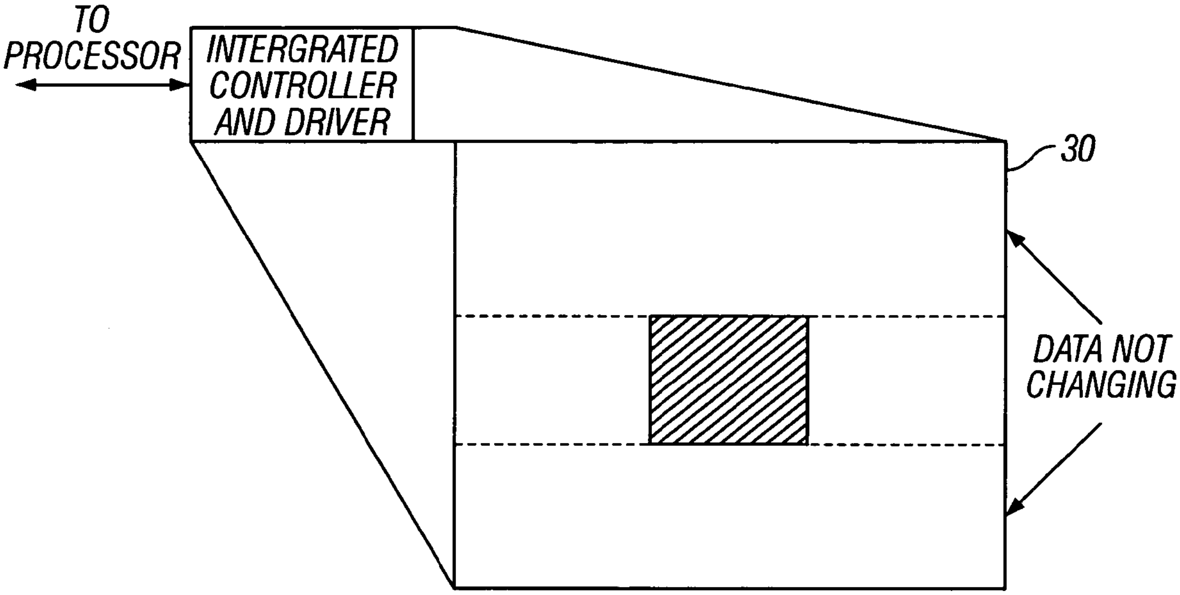
FIG. 16 is a schematic diagram illustrating a controller that can be integrated with an array driver.

FIG. 16 is a schematic diagram illustrating a controller that can be integrated with an array driver. In the embodiment shown in FIG. 16, a driver controller is integrated with an array driver. Specialized circuitry within the integrated driver controller and driver first determines which pixels and hence rows require refresh, and only selects and updates those rows that have pixels that have changed. With such circuitry, particular rows can be addressed in non-sequential order, on a changing basis depending on image content. This embodiment is advantageous because only the changed video data needs to be communicated through the interface between the integrated controller and driver circuitry and the array driver circuitry refresh rates can be reduced between the processor and the display array 30. Lowering the effective refresh rate required between processor and display controller lowers power consumption, improves noise immunity, and decreases electromagnetic interference issues for the system.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

The invention claimed is:

1. A system configured to display video data on an array of bi-stable display elements, the system comprising:

a processor configured to receive video data;

a display comprising an array of bi-stable display elements;

a driver controller separate from and in data communication with the processor and configured to receive the video data from the processor wherein the driver controller is not specifically configured for driving the array of bi-stable display elements; and an array driver directly connected to the driver controller and configured to receive the video data from the driver controller, the array driver further being directly connected to the processor and configured to receive display signals directly from the processor, the connection between the array driver and the processor being different from the connection between the array driver and the driver controller, the array driver being further configured to display the video data on the array of bi-stable display elements using the display signals, wherein the display signals reduce a refresh and/or update rate of displaying the video data on the array of bi-stable display elements from a refresh and/or update rate corresponding to the configuration of the driver controller, and in accordance with the display features of the array of bi-stable display elements.

2. The system of claim 1, wherein the array of bi-stable display elements comprise interferometric modulators.

3. The system of claim 1, wherein the display signals comprise instructions that are used by the array driver to control a drive scheme for the array of bi-stable display elements.

4. The system of claim 1, wherein the array driver is configured to partition the array into one or more regions based on the display signals.

5. The system of claim 1, wherein the array driver receives region information from the processor that identifies a group of bi-stable display elements of the array of bi-stable display elements, and wherein the display signals are used to control a refresh rate for the identified group of bi-stable display elements.

6. The system of claim 1, wherein the array driver is further configured to display the video data in an interlaced format.

7. A method of displaying data, comprising:

transmitting video data from a processor directly to a driver controller, wherein the driver controller is separate from the processor;

transmitting the video data from the driver controller directly to an array driver through a first connection, the array driver being connected to an array of bi-stable display elements, and wherein the driver controller is not specifically configured for driving the array of bi-stable display elements;

transmitting display signals directly from the processor to the array driver through a second connection, the second connection directly connecting the processor and the array driver to allow data communication between the processor and the array driver, the second connection being different from the first connection;

executing at least part of the transmitted display signal, wherein the executed display signals operate to control the frequency that the image displayed by the array of bi-stable display elements is updated by reducing a refresh and/or update rate of displaying the video data on the array of bi-stable display elements from a refresh and/or update rate corresponding to the configuration of the driver controller, and in accordance with the display features of the array of bi-stable display elements; and updating an image displayed on the array of bi-stable display elements, wherein the updating is based on the transmitted display signals.

8. The method of claim 7, additionally comprising:

determining a display rate of video data; and generating display signals based at least in part upon the determined display rate.

9. The method of claim 7, additionally comprising partitioning the array into one or more groups of bi-stable display elements using partition information contained in the display signals, wherein updating an image displayed comprises updating an image displayed on the one or more groups of bi-stable display elements of the array, wherein each of the one or more groups is updated at a refresh rate that is specified by information contained in the display signals.

10. The method of claim 7, wherein the array of bi-stable display elements comprises a plurality of interferometric modulators.

11. The method of claim 7, wherein updating an image displayed on the array comprises displaying the image in an interlaced format.

12. A system for displaying video data on a bi-stable display, comprising:

first means for directly coupling a processor to a driver controller and transmitting video data from the processor to the driver controller, wherein the driver controller is separate from the processor, and the driver controller is not specifically configured for driving the bi-stable display;

second means for directly coupling the processor to an array driver of an array of bi-stable display elements and transmitting display signals directly from the processor to the array driver, the second coupling and transmitting means being different from the first coupling and transmitting means;

means for transmitting the video data from the driver controller directly to the array driver;

means for executing at least part of the transmitted display signals, wherein the executed display signals operate to control a frequency which the image displayed by the array of bi-stable display elements is updated by reducing a refresh and/or update rate of displaying the video data on the array of bi-stable display elements from a refresh and/or update rate corresponding to the configuration of the driver controller, and in accordance with the display features of the array of bi-stable display elements; and means for updating an image displayed by the array of bi-stable display elements, wherein the updating is based on the transmitted display signals.

13. The system of claim 12, wherein the array of bi-stable display elements comprise interferometric modulators.

14. The system of claim 12, additionally comprising:

means for determining a display rate of video data; and means for generating display signals based at least in part upon the determined display rate.

15. The system of claim 12, additionally comprising:

means for transmitting region information identifying a group of the bi-stable display elements; and wherein updating the image that is displayed is performed for the group of bi-stable display elements.

* * * * *